US012189560B2

(12) United States Patent
Yeo et al.

(10) Patent No.: US 12,189,560 B2
(45) Date of Patent: Jan. 7, 2025

(54) APPARATUS AND METHOD FOR TRAINING DEVICE-TO-DEVICE PHYSICAL INTERFACE

(71) Applicant: Samsung Electronics Co., Ltd., Suwon-si (KR)

(72) Inventors: Taekyung Yeo, Seoul (KR); Sangyun Hwang, Suwon-si (KR); Sujeong Kim, Hwaseong-si (KR); Jihun Oh, Hwaseong-si (KR); Joohee Shin, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 8 days.

(21) Appl. No.: 17/475,705

(22) Filed: Sep. 15, 2021

(65) Prior Publication Data

US 2022/0121592 A1    Apr. 21, 2022

(30) Foreign Application Priority Data

Oct. 19, 2020    (KR) .................. 10-2020-0135525

(51) Int. Cl.
*G06F 13/40*    (2006.01)
*G06F 13/42*    (2006.01)

(52) U.S. Cl.
CPC ...... *G06F 13/4022* (2013.01); *G06F 13/4295* (2013.01)

(58) Field of Classification Search
None
See application file for complete search history.

(56) References Cited

U.S. PATENT DOCUMENTS

| 5,974,516 | A | * | 10/1999 | Qureshi .................. G06F 5/065 710/52 |
| 6,426,903 | B1 | | 7/2002 | Clevenger et al. |
| 6,697,443 | B1 | * | 2/2004 | Kim .................. H03M 13/4184 714/795 |
| 7,353,316 | B2 | | 4/2008 | Erdmann |
| 8,077,605 | B2 | | 12/2011 | McCarty et al. |
| 9,330,268 | B2 | * | 5/2016 | Yoon .................. G06F 11/273 |
| 9,430,432 | B2 | * | 8/2016 | Kanigicherla .......... G06F 13/40 |
| 9,443,269 | B2 | * | 9/2016 | Battyani ............. G06Q 30/0201 |
| 9,536,863 | B2 | * | 1/2017 | Hinck ..................... H04B 1/40 |
| 9,659,608 | B2 | | 5/2017 | Jung |

(Continued)

FOREIGN PATENT DOCUMENTS

KR    10-2019-0085264 A    7/2019

*Primary Examiner* — Henry Tsai
*Assistant Examiner* — Christopher A Bartels
(74) *Attorney, Agent, or Firm* — Harness, Dickey & Pierce, P.L.C.

(57) ABSTRACT

A method of training a physical interface between a first device and a second device includes performing a first training of the physical interface by communicating with the second device by using a first candidate group of lanes from among a plurality of lanes; performing a second training of the physical interface by communicating with the second device by using a second candidate group of lanes from among the plurality of lanes, the second candidate group being different from the first candidate group; determining a lane group based on a result of the first training and a result of the second training; and setting the second device so that the determined lane group is used for the physical interface.

17 Claims, 18 Drawing Sheets

(56) References Cited

U.S. PATENT DOCUMENTS

| | | | | |
|---|---|---|---|---|
| 10,642,764 | B1* | 5/2020 | Gerhart | G06F 13/4282 |
| 10,650,871 | B2 | 5/2020 | Chae et al. | |
| 11,256,644 | B2* | 2/2022 | Mekad | G06F 13/4022 |
| 11,431,561 | B2* | 8/2022 | Smith | G06F 16/1824 |
| 11,776,276 | B1* | 10/2023 | Muron | G06V 20/54 |
| | | | | 382/100 |
| 2013/0231556 | A1* | 9/2013 | Holsing | G06T 7/12 |
| | | | | 600/424 |
| 2013/0268706 | A1* | 10/2013 | Yun | G06F 13/4022 |
| | | | | 710/110 |
| 2015/0055947 | A1* | 2/2015 | Xia | H04Q 11/0066 |
| | | | | 398/28 |
| 2015/0304772 | A1* | 10/2015 | Risberg | H04R 3/007 |
| | | | | 381/55 |
| 2016/0224489 | A1* | 8/2016 | Mishra | G06F 13/364 |
| 2016/0299855 | A1* | 10/2016 | Pitigoi-Aron | G06F 13/4295 |
| 2018/0136899 | A1* | 5/2018 | Risberg | H04R 3/04 |
| 2019/0033845 | A1* | 1/2019 | Cella | G06N 7/01 |
| 2019/0235890 | A1* | 8/2019 | Schnoor | G06F 13/4068 |
| 2020/0049767 | A1* | 2/2020 | Kim | G01R 31/31725 |
| 2020/0105994 | A1* | 4/2020 | Leipold | H01L 29/7613 |
| 2020/0133542 | A1 | 4/2020 | Kim et al. | |
| 2020/0143854 | A1 | 5/2020 | Kim et al. | |
| 2020/0385266 | A1* | 12/2020 | Leipold | H03M 13/1575 |
| 2021/0010954 | A1* | 1/2021 | Adler | H05K 1/115 |
| 2021/0194724 | A1* | 6/2021 | Lee | H04J 14/0283 |
| 2021/0248102 | A1* | 8/2021 | Cheng | G06F 13/4282 |
| 2021/0397577 | A1* | 12/2021 | Kahn | H04L 67/1097 |
| 2022/0222492 | A1* | 7/2022 | Guo | G06K 9/6262 |
| 2023/0089205 | A1* | 3/2023 | Cella | G05B 19/41875 |
| | | | | 702/188 |
| 2023/0281527 | A1* | 9/2023 | Cella | G06N 3/088 |
| | | | | 705/7.17 |

* cited by examiner

APPARATUS AND METHOD FOR TRAINING DEVICE-TO-DEVICE PHYSICAL INTERFACE

CROSS-REFERENCE TO RELATED APPLICATION

This application is based on and claims priority under 35 U.S.C. § 119 to Korean Patent Application No. 10-2020-0135525, filed on Oct. 19, 2020 in the Korean Intellectual Property Office, the disclosure of which is incorporated by reference herein in its entirety.

BACKGROUND

At least some example embodiments of the inventive concepts relate to a device-to-device physical interface, and more particularly, to an apparatus and a method for training a device-to-device physical interface.

Devices may communicate with each other based on a physical interface known thereto. For example, the devices may communicate with each other by transceiving electrical signals via wires based on the physical interface, and may communicate with each other by transceiving optical signals via waveguides. As a high throughput between the devices is required, advanced functions for a high bandwidth may be employed in the physical interface, and accordingly, device-to-device communication based on the physical interface providing the high bandwidth may be sensitive to various factors.

SUMMARY

At least some example embodiments of the inventive concepts provide an apparatus and a method for training a physical interface providing an optimum device-to-device communication.

According to at least some example embodiments of the inventive concepts, a method of training a physical interface between a first device and a second device includes performing a first training of the physical interface by communicating with the second device by using a first candidate group of lanes from among a plurality of lanes; performing a second training of the physical interface by communicating with the second device by using a second candidate group of lanes from among the plurality of lanes, the second candidate group being different from the first candidate group; determining a lane group based on a result of the first training and a result of the second training; and setting the second device so that the determined lane group is used for the physical interface.

According to at least some example embodiments of the inventive concepts, a first device configured to communicate with a second device based on a physical interface includes a routing circuit configured to select some of a plurality of lanes based on a control signal, for the physical interface; and a controller including processing circuitry configured to generate the control signal for training the physical interface by using each of different candidate groups of lanes from among the plurality of lanes, and determine a lane group to be used for the physical interface based on a result of the training.

According to at least some example embodiments of the inventive concepts, a system includes a plurality of interconnections; and a first device and a second device configured to communicate with each other via at least some of the plurality of interconnections based on a physical interface, wherein the first device and the second device are configured to train the physical interface by using each of a plurality of different candidate groups, each candidate group including interconnections from among the plurality of interconnections, and wherein first device is configured to determine an interconnection group to be used for the physical interface based on training results.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
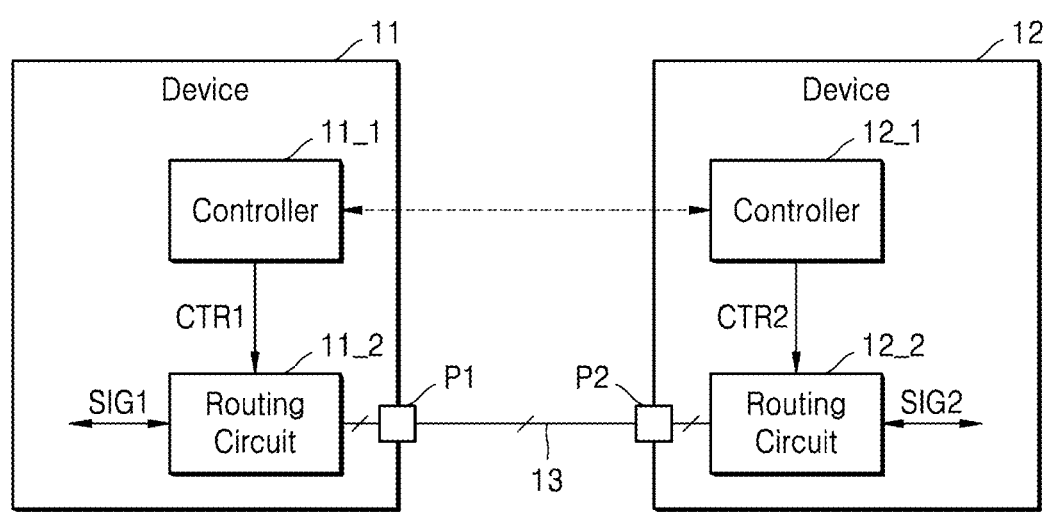
FIG. 1 is a block diagram of a system according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a system 10 according to at least one example embodiment of the inventive concepts. As illustrated in FIG. 1, the system 10 may include a first device 11 and a second device 12 communicating with each other via a plurality of interconnections 13.

The system 10 may be referred to as any system including the first device 11 and the second device 12 communicating with each other via the plurality of interconnections 13. In some embodiments, the first device 11 and the second device 12 may include integrated circuits manufactured by a semiconductor process. For example, the first device 11 and the second device 12 may be included in the same die, and communicate with each other via the plurality of interconnections 13 formed in the die. For example, the first device 11 and the second device 12 may be respectively included in different dies, and communicate with each other via the plurality of interconnections 13 formed outside the dies. In some embodiments, the first device 11 and the second device 12 may be housed independently of each other, and may communicate with each other via the plurality of interconnections 13 exposed outside housings.

The first device 11 and the second device 12 may communicate with each other based on a physical interface known to each other. The physical interface may correspond to a physical layer among communication layers, and the first device 11 and the second device 12 may transceive signals via the plurality of interconnections 13 based on the physical interface. As used in the present specification, the terms "transceive" and "transceiving" refer to transmitting, receiving, or transmitting and receiving. According to at least some example embodiment of the inventive concepts, the plurality of interconnections 13 may be embodied by a medium that transmits signals between the first device 11 and the second device 12. For example, the plurality of interconnections 13 may include conductive wires (for example, a through silicon via (TSV), a micro-bump (MB), etc. in FIG. 15) for transmitting electrical signals, and may also include waveguides for transmitting optical signals. As illustrated in FIG. 1, each of the plurality of interconnections 13 may be connected to a plurality of first pins P1 of the first device 11 and a plurality of second pins P2 of the second device 12. One interconnection, and a first pin and a second pin connected thereto may be included in a signal path through which a signal travels, and one signal path may be referred to as a lane herein. In other words, one lane may include one interconnection (e.g., a connection between one of first pins P1 and one of second pins P2), and the number of lanes may match the number of interconnections. According to at least some example embodiments of the inventive concepts, the physical interface between the first device 11 and the second device 12 includes the plurality of interconnections 13, the plurality of first pins P1, and the plurality of second pins P2. According to at least some example embodiments of the inventive concepts, the physical interface between the first device 11 and the second device 12 further includes the first and second routing circuits 11_2 and 12_2, and is controlled by one or both of the first controller 11_1 and the second controller 12_1.

The first device 11 may include a first controller 11_1, a first routing circuit 11_2, and the plurality of first pins P1, and the second device 12 may include a second controller 12_1, a second routing circuit 12_2, and the plurality of second pins P2. As illustrated in FIG. 1, the first controller 11_1 may provide a first control signal CTR1 to the first routing circuit 11_2, and the first routing circuit 11_2 may form a path through which a first signal SIG1 passes based on the first control signal CTR1. Similarly, the second controller 12_1 may provide a second control signal CTR2 to the second routing circuit 12_2, and the second routing circuit 12_2 may provide a path through which a second signal SIG2 passes based on the second control signal CTR2. Examples of the first routing circuit 11_2 and the second routing circuit 12_2 will be described later with reference to FIG. 6.

In some embodiments, the number of lanes formed between the first device 11 and the second device 12 may be greater than the number of signal paths required for the physical interface, and the first device 11 and the second device 12 may communicate with each other via some of the plurality of lanes. The lanes used for communication between the first device 11 and the second device 12 may correspond to the paths formed by the first routing circuit 11_2 and the second routing circuit 12_2, and may be determined by the first control signal CTR1 and the second control signal CTR2. In other words, the first routing circuit 11_2 may select some of the plurality of first pins P1 based on the first control signal CTR1, the second routing circuit 12_2 may select some of the plurality of the second pins based on the second control signal CTR2, and as a result, the lanes corresponding to the selected first and second pins P1 and P2 may be selected. One lane may include one interconnection and a pair of pins, and herein, selection and determination of the lanes may have the same meaning as selection and determination of the interconnections and/or the pins.

The first controller 11_1 and the second controller 12_1 may perform a training of a physical interface between the first device 11 and the second device 12. Training of the physical interface may be referred to as an operation performed by a transmitting side and a receiving side for determining a timing of a signal transmitted by the transmitting side, so that the receiving side easily and effectively identifies the signal transmitted by the transmitting side. For example, a timing of the first signal SIG1 provided to the first routing circuit 11_2 may be determined, so that information included in the first signal SIG1 transmitted by the first device 11 via some of the plurality of interconnections 13 is identical to information identified from the second signal SIG2 received by the second device 12. In addition, the timing of the first signal SIG1 provided to the first routing circuit 11_2 may be determined, so that the second device 12 more easily identifies information from the second signal SIG2. Similarly, a timing of the second signal SIG2 transmitted by the second device 12 may be determined by using the training of the physical interface.

The first controller 11_1 and the second controller 12_1 may train the physical interface by using each of different candidate groups among the plurality of lanes, and may determine a lane group (or an interconnection group or a pin group) to be used for the physical interface based on the training results. To this end, the first controller 11_1 may select the candidate group among the plurality of lanes (or the plurality of interconnections 13, or the plurality of first pins P1), and may generate the first control signal CTR1 based on the selected candidate group. In addition, as illustrated by a dashed line in FIG. 1, the first controller 11_1 and the second controller 12_1 may communicate with each other, the first controller 11_1 may provide information about the selected candidate group to the second controller 12_1, and the second controller 12_1 may generate the second control signal CTR2 based on information provided by the first controller 11_1. In some embodiments, the first controller 11_1 and the second controller 12_1 may communicate with each other via at least some of the plurality of interconnections 13, and may communicate with each other via a channel (for example, WS1 through WSn in FIG. 13) independent of the plurality of interconnections 13.

The first controller 11_1 may identify the best training result among the training results respectively corresponding to the different candidate groups, and may determine a candidate group corresponding to the identified best training result as lanes (or interconnections or pins) for the physical interface. The first controller 11_1 may generate the first control signal CTR1 based on the determined lanes, and may provide information about the determined lanes to the second controller 12_1, and the second controller 12_1 may generate the second control signal CTR2 based on information provided by the first controller 11_1. Accordingly, interconnections that provide optimal performance (for example, margin) may be detected among the plurality of interconnections 13, and as a result, the reliability of communication between the first device 11 and the second device 12 may be significantly improved. In addition, as the optimal margin corresponding to connection states of the first device 11 and the second device 12 is detected, defects due to the physical interface between the first device 11 and the second device 12 may be removed or reduced, and accordingly, the yield of the system 10 including the first device 11 and the second device 12 may be improved. The first controller 11_1 and/or the second controller 12_1 may have a structure that is designed and/or programmed for performing the above-described operations, and may include, for example, at least one core executing a series of instructions, a logic circuit designed by using logic synthesis, and a combination thereof. For example, one or both of the first controller 11_1 and the second controller 12_1 may be embodied by processing circuitry such as hardware including logic circuits; a hardware/software combination executing software; or a combination thereof. For example, the processing circuitry more specifically may include, but is not limited to, one or more of a central processing unit (CPU), an arithmetic logic unit (ALU), a digital signal processor, a microcomputer, a field programmable gate array (FPGA), a programmable logic unit, a microprocessor, an application-specific integrated circuit (ASIC), etc.

Figure 2:
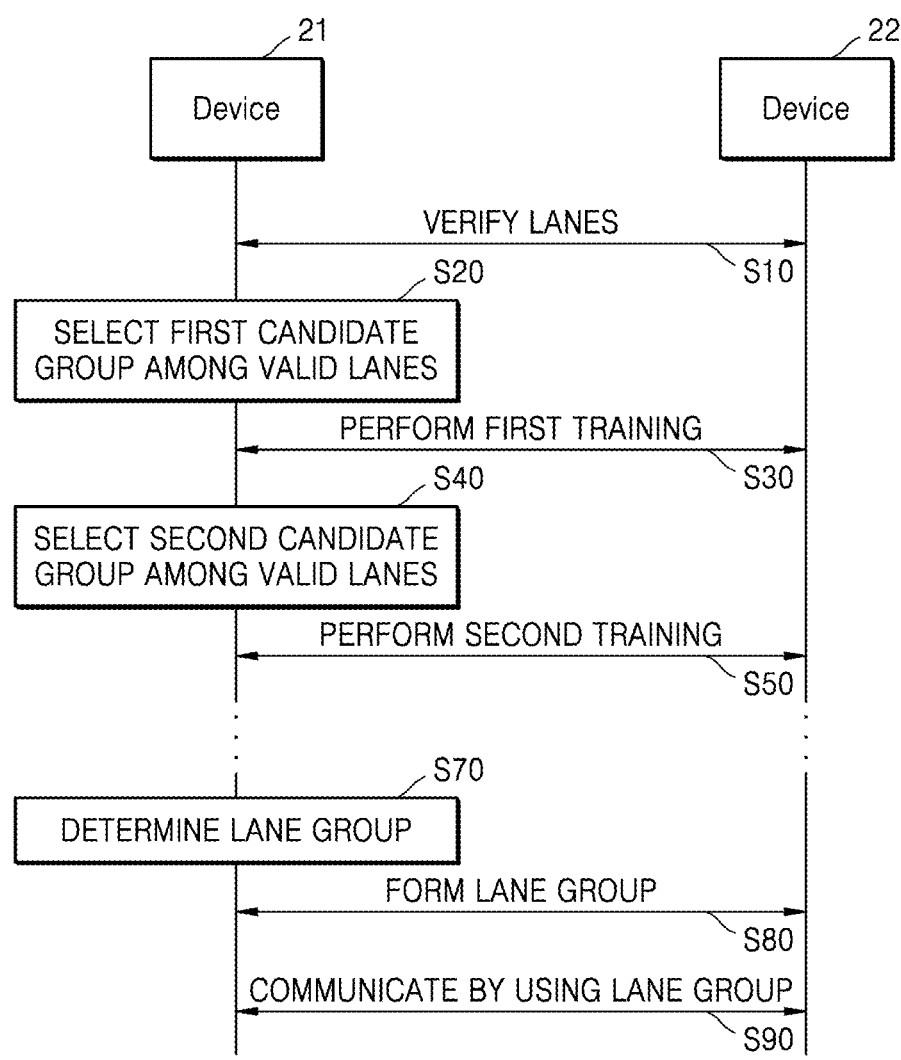
FIG. 2 is a flowchart of a method of training a physical interface, according to at least one example embodiment of the inventive concepts.

FIG. 2 is a flowchart of a method of training a physical interface, according to at least one example embodiment of the inventive concepts. As described above with reference to FIG. 1, a first device 21 may be connected to a second device 22 in FIG. 2 via a plurality of interconnections, and a training of a physical interface may be performed.

Referring to FIG. 2, the first device 21 and the second device 22 may verify lanes in operation S10. As described above with reference to FIG. 1, the lane may correspond to one signal path through which a signal passes between the first device 21 and the second device 22, and may include interconnection and a pair of pins connected thereto. Due to a defect of the first device 21, a defect of the second device 22, a defect of one or more interconnections between the first device 21 and the second device 22, or the like, some of the plurality of lanes may be unavailable. Accordingly, the first device 21 and the second device 22 may verify the lanes, and detect valid lanes. When an invalid lane is detected, the first device 21 and the second device 22 may not use the interconnection and the pair of pins which are included in the invalid lane, and may communicate with each other via the interconnection and the pair of pins included in valid lanes. In this manner, an operation of detecting the invalid lane and replacing the invalid lane with the valid lane may be referred to as a lane repair, and for the lane repair, the first device 21 and the second device 22 may be interconnected to each other via a greater number of lanes than the number of signal paths required for the physical interface. Accordingly, even when some of the lanes are unavailable, the first device 21 and the second device 22 may communicate normally.

According to at least some example embodiments of the inventive concepts, the first device 21 and the second device 22 may detect valid (and/or invalid) lanes. In the present specification, detecting whether one or more lanes are valid (or invalid) may be referred to as verifying, or performing verification with respect to, the lane(s). According to at least some example embodiments, in order to verify a plurality of lanes, the first device 21 may transmit a known signal to the second device 22 via the plurality of lanes, the second device 22 may provide a signal as feedback received via the plurality of lanes to the first device 21, and the first device 21 may detect the valid lane(s) from among the plurality of lanes based on the feedback of the second device 22. In the present specification, verification of a lane may be referred to as verification of an interconnection and/or a pair of pins included in the lane; a lane, an interconnection, and a pin that have passed verification may be referred to as a valid (or verified) lane, a valid interconnection, and a valid pin, respectively; and a lane, an interconnection, and a pin that have failed verification may be referred to as an invalid lane, an invalid interconnection, and an invalid pin, respectively.

The first device 21 may select a first candidate group among the valid lanes in operation S20. The first candidate group may include the number of lanes required to communicate with the second device 22 based on the physical interface. In some embodiments, each of the first device 21 and the second device 22 may include pins pre-allocated for the physical interface and pins for the lane repair (which may be referred to as redundancy pins herein). The first device 21 may select the first candidate group, so that the pre-allocated pins are used for the physical interface in an initial training (e.g., a first training which will be described in greater detail below).

The first device 21 and the second device 22 may perform the first training of the physical interface in operation S30. For example, the first device 21 (or a routing circuit) may form internal paths including the pins corresponding to the first candidate group selected in operation S20, and may provide information about the first candidate group to the second device 22, and the second device 22 may form the internal paths including the pins corresponding to the first candidate group based on the information provided by the first device 21. The first device 21 and the second device 22 may perform the first training by using the first candidate group, and accordingly, a timing of a signal sent between the first device and the second device may be determined in the physical interface using the first candidate group. Examples of training of the physical interface will be described later with reference to FIGS. 3A and 3B, and an example of operation S30 will be described in greater detail below with reference to FIG. 7.

The first device 21 may select a second candidate group among the valid lanes in operation S40. The second candidate group may have the number of lanes required to communicate with the second device 22 based on the physical interface, and may be different from the first candidate group in operation S20. In some embodiments, the first device 21 may select the second candidate group based on a result of the first training in operation S30, and an example of operation S40 will be described later with reference to FIG. 7.

The first device 21 and the second device 22 may perform a second training of the physical interface in operation S50. For example, the first device 21 may form internal paths including the pins corresponding to the second candidate group selected in operation S40, may transmit information about the second candidate group to the second device 22, and the second device 22 may form the internal paths including the pins corresponding to the second candidate group based on the information provided by the first device 21. The first device 21 and the second device 22 may perform the second training by using the second candidate group, and accordingly, a timing of a signal sent between the first device and the second device may be determined in the physical interface using the second candidate group.

The first device 21 may determine a lane group including the lanes to be used for the physical interface in operation S70. For example, the first device 21 may determine the lane group based on the result of the first training performed in operation S30 and the result of the second training performed in operation S50. An example of operation S50 will be described in greater detail below with reference to FIG. 8. In some embodiments, the first device 21 and the second device 22 may additionally perform at least one training prior to operation S70, and the lane group may be determined based on the results of the first training and the second training as well as the result of at least one training that has been additionally performed. For example, the first device 21 may select a third candidate group that is different from the first candidate group and the second candidate group among the valid lanes after operation S50, and the first device 21 and the second device 22 may perform the third training by using the third candidate group. According to at least some example embodiments, the first device 21 may identify a candidate group that provides desirable or, alternatively, optimal performance (or margin) among the candidate groups, and the identified candidate group may be lane group determined in operation S70. In some embodiments, the first device 21 may determine the lane group based on a valid window margin as the result of the training, and an example of operation S70 will be described later with reference to FIG. 8.

The first device 21 and the second device 22 may form the lane group in operation S80. For example, the first device 21 may form the internal paths including the pins corresponding to the lane group determined in operation S70, and may provide information about the lane group to the second device 22, and the second device 22 may form the internal paths including the pins corresponding to the lane group based on the information provided by the first device 21. Herein, that the first device 21 provides information about the lane group to the second device 22 may be referred to as configuring the second device 22 so that the lane group is used for the physical interface.

The first device 21 and the second device 22 may communicate with each other via the lane group in operation S90. Due to the lane group providing the optimal margin, the communication between the first device 21 and the second device 22 may be less sensitive to various factors, and may stably use a high bandwidth provided by the physical interface.

Figure 3A:
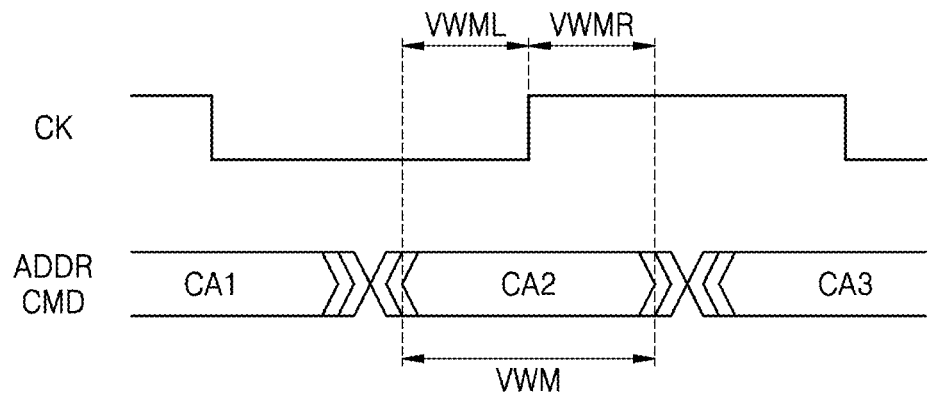
FIGS. 3A and 3B are timing diagrams illustrating examples of training a physical interface, according to at least some example embodiments of the inventive concepts.
Figure 3B:
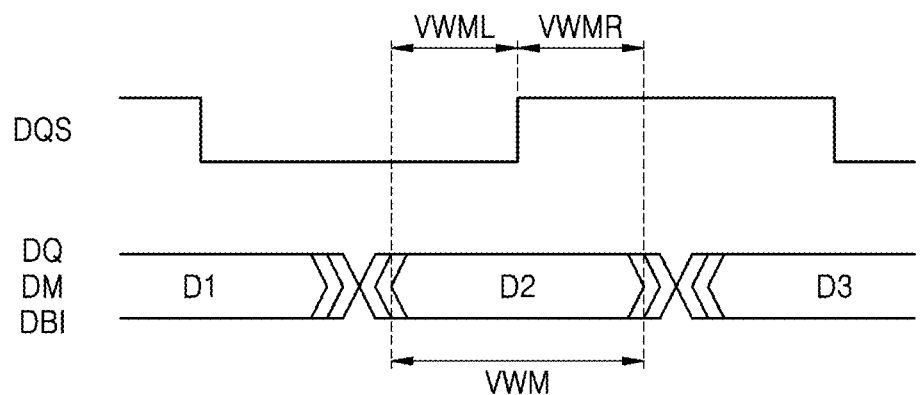

FIGS. 3A and 3B are timing diagrams illustrating examples of training the physical interface, according to at least some example embodiments of the inventive concepts. The timing diagrams of FIGS. 3A and 3B may represent examples of the training performed by a memory interface as an example of the physical interface. Training of a memory interface may include an address (or a command) training and a data training, the timing diagram of FIG. 3A may represent an example of the address training, and the timing diagram of FIG. 3B may represent an example of the data training. In the descriptions with reference to FIGS. 3A and 3B below, it is assumed that the second device 12 in FIG. 1 is a memory device, and the first device 11 is a device that communicates with the memory device and a host between the memory device and the host, and duplicate descriptions thereof will be omitted. The memory device may include a volatile memory such as static random access memory (RAM) (SRAM) or dynamic RAM (DRAM), and a non-volatile memory such as a flash memory and resistive RAM (RRAM).

Referring to FIG. 3A, the first device 11 may provide a clock signal CK, an address signal ADDR, and a command signal CMD to the second device 12. In some embodiments, the address signal ADDR and the command signal CMD may be provided by the first device 11 to the second device 12 via the same lanes. The memory interface may define that the address signal ADDR and the command signal CMD are latched at each of a rising edge and a falling edge of the clock signal CK, and accordingly, as illustrated in FIG. 3A, the address signal ADDR and the command signal CMD may be required to be maintained constant before and after the rising edge and the falling edge of the clock signal CK. As illustrated in FIG. 3A, an interval in which the address signal ADDR and the command signal CMD are maintained constant before and after the rising and falling edges of the clock signal CK may be referred to as the valid window margin VWM, and the valid window margin VWM may include a first interval VWML before an edge of the clock signal CK (may be referred to as a setup time) and a second interval VWMR after an edge of the clock signal CK (referred to as a hold interval). When the address signal ADDR and/or the command signal CMD are transmitted in parallel as a multi-bit signal via a plurality of lanes, the valid window margin VWM of the address signal ADDR and/or the command signal CMD may correspond to a minimum valid window margin among a plurality of valid window margins VWMs corresponding to the plurality of lanes.

The physical interface may require the valid window margin VWM (or the minimum first interval VWML and the minimum second interval VWMR) equal to or greater than a threshold value. In some embodiments, the first device 11 and the second device 12 may perform an address training, so that the edges of the clock signal CK are located at the centers of the valid window margin VWM. As the valid window margin VWM becomes larger, the second device 12 may more easily latch the address signal ADDR and the command signal CMD, and accordingly, an error that occurs when the address signal ADDR and the command signal CMD are received may be reduced.

Referring to FIG. 3B, during a write operation, the first device 11 may provide a data strobe signal DQS, a data signal DQ, a data mask signal DM, and a data bus inversion signal DBI to the second device 12. In addition, during a read operation, the second device 12 may provide the data strobe signal DQS, the data signal DQ, the data mask signal DM, and the data bus inversion signal DBI to the first device 11. Accordingly, the data training may include a training for a write path and a training for a read path. In some embodiments, the pins of the first device 11 and the second device 12 connected to the interconnections, via which the data strobe signal DQS, the data signal DQ, the data mask signal DM, and the data bus inversion signal DBI pass, may be bi-directional pins.

The memory interface may define that the data signal DQ, the data mask signal DM, and the data bus inversion signal DBI are latched at each of the rising and falling edges of the data strobe signal DQS. Accordingly, as illustrated in FIG. 3B, the data signal DQ, the data mask signal DM, and the data bus inversion signal DBI may be required to be maintained constant during the valid window margin VWM including the first interval VWML and the second interval VWMR. The physical interface may require the valid window margin VWM (or the minimum first interval VWML and the minimum second interval VWMR) equal to or greater than a threshold value. In some embodiments, the first device 11 and the second device 12 may perform the data training, so that the edge of the data strobe signal DQS is at the center of the valid window margin VWM. As the valid window margin VWM is increased, the first device 11 and the second device 12 may more easily latch the data signal DQ, the data mask signal DM, and the data bus inversion signal DBI, and errors that occurs when the data signal DQ, the data mask signal DM, and the data bus inversion signal DBI are received may be reduced.

As described below with reference to drawings, lanes providing the best valid window margin VWM may be determined by training a physical interface. Accordingly, a device-to-device physical interface that is less sensitive from various factors while providing a high bandwidth may be achieved.

Figure 4A:
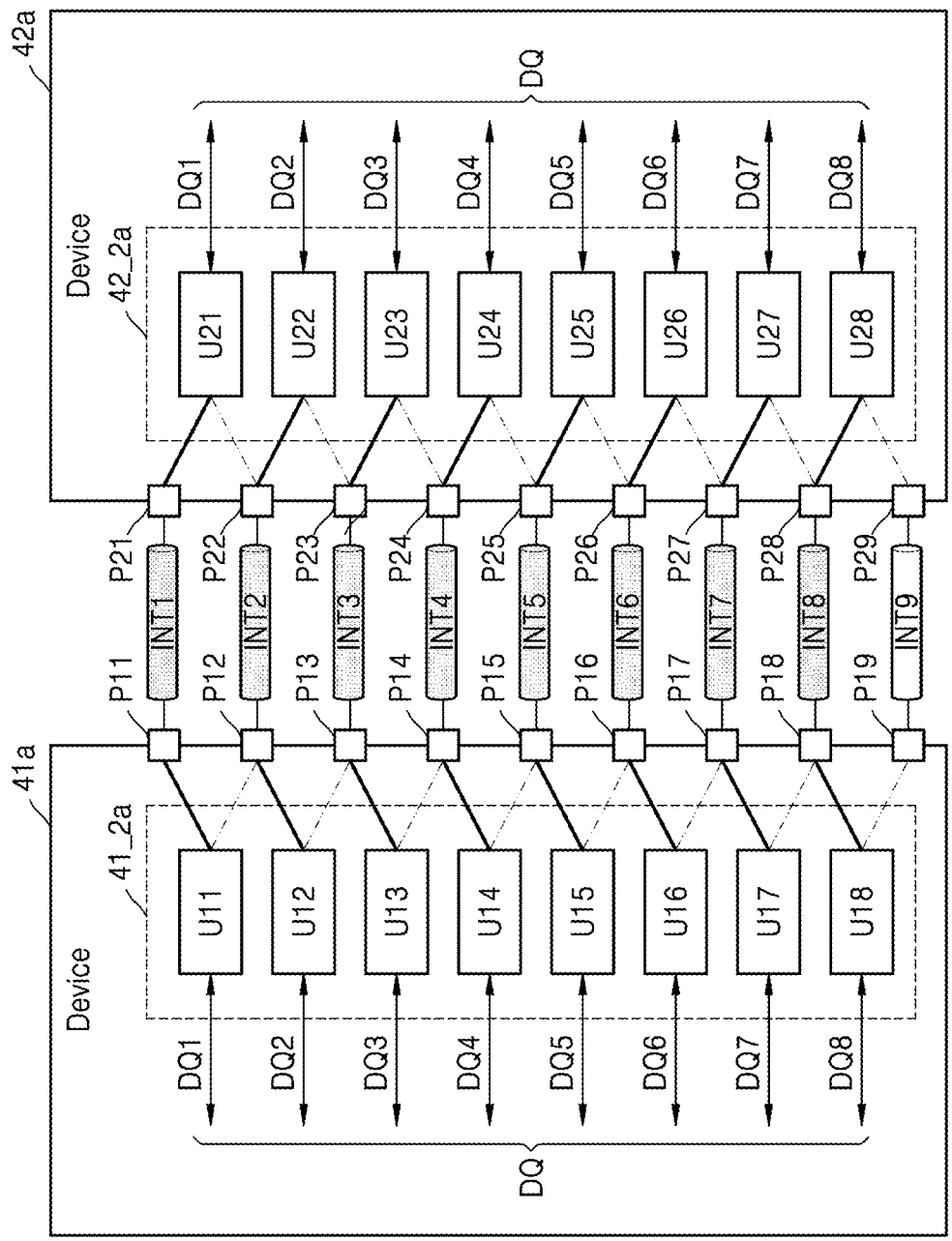
FIGS. 4A and 4B are block diagrams illustrating examples of training a physical interface, according to at least some example embodiments of the inventive concepts.
Figure 4B:
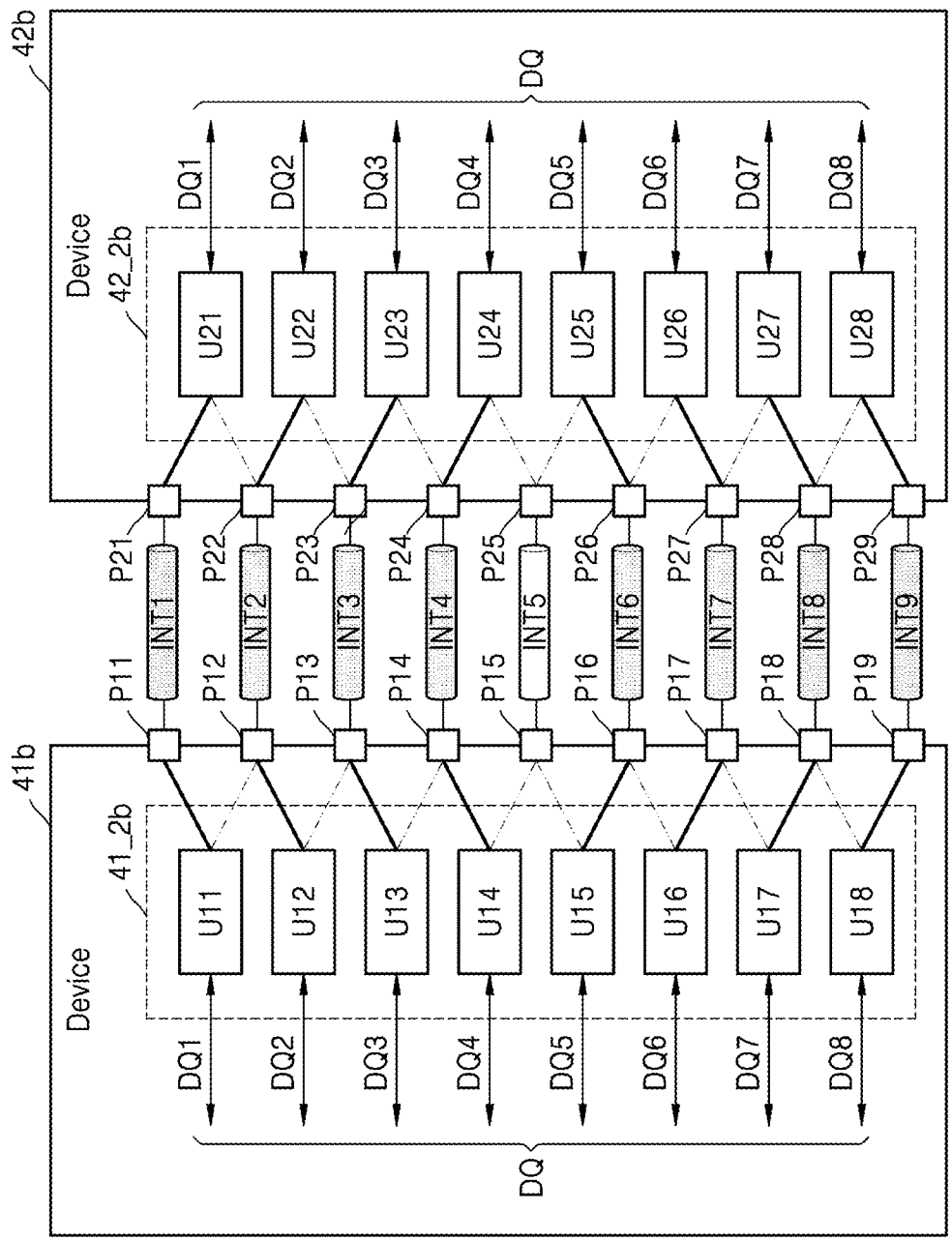

FIGS. 4A and 4B are block diagrams illustrating examples of training a physical interface, according to at least some example embodiments of the inventive concepts. Each of the block diagrams of FIGS. 4A and 4B may represent a training performed on different candidate groups of the lanes.

Referring to FIG. 4A, a first device 41a may be connected to a second device 42a via first through ninth interconnections INT1 through INT9, and accordingly, nine lanes may be formed between the first device 41a and the second device 42a. The first device 41a and the second device 42a may mutually transceive the data signal DQ having 8 bits via eight lanes. The first device 41a may include a first routing circuit 41_2a and nine first pins P11 through P19, and the second device 42a may include a second routing circuit 42_2a and nine second pins P21 through P29. The nine first pins P11 through P19 may be connected to the first through ninth interconnections INT1 through INT9, respectively, and the nine second pins P21 through P29 may be connected to the first through ninth interconnections INT1 through INT9, respectively.

Eight lanes corresponding to the first through eighth interconnections INT1 through INT8 among the nine lanes may be selected as a candidate group (for example, a first candidate group). To this end, the first routing circuit 41_2a may form internal paths, so that the data signal DQ is transmitted or received via the eight first pins P11 through P18 respectively connected to the first through eighth interconnections INT1 through INT8. In addition, the second routing circuit 42_2a may form internal paths, so that the data signal DQ is transmitted or received via the eight second pins P21 through P28 respectively connected to the first through eighth interconnections INT1 through INT8.

As illustrated in FIG. 4A, the first routing circuit 41_2a may include eight first unit circuits U11 through U18 respectively corresponding to first through eighth data signals DQ1 through DQ8 of the data signal DQ. As illustrated by solid lines in FIG. 4A, the eight first unit circuits U11 through U18 may output the data signal DQ to the first pins P11 through P18, or may receive the data signal DQ from the first pins P11 through P18. Similarly, the second routing circuit 42_2a may include eight second unit circuits U21 through U28 respectively corresponding to the first through eighth data signals DQ1 through DQ8 of the data signal DQ, and the eight second unit circuits U21 through U28 may output the data signal DQ to the eight second pins P21 through P28 or receive the data signal DQ from the eight second pins P21 through P28, respectively. Accordingly, the ninth interconnection ING9 may not be used, and the first pin P19 and the second pin P29 connected to the ninth interconnection INT9 may not be used.

Referring to FIG. 4B, a first device 41b may be connected to a second device 42b via the first through ninth interconnections INT1 through INT9, and accordingly, nine lanes may be formed between the first device 41b and the second device 42b. The first device 41b and the second device 42b may mutually transceive the data signal DQ having 8 bits via eight lanes. The first device 41b may include a first routing circuit 41_2b and nine first pins P11 through P19, and the second device 42b may include a second routing circuit 42_2b and nine second pins P21 through P29. The nine first pins P11 through P19 may be connected to the first through ninth interconnections INT1 through INT9, respectively, and the nine second pins P21 through P29 may be connected to the first through ninth interconnections INT1 through INT9, respectively.

Eight lanes corresponding to the first through fourth interconnections INT1 through INT4 and the sixth through ninth interconnections INT6 through INT9 among the nine lanes may be selected as a candidate group (for example, a second candidate group). To this end, the first routing circuit 41_2b may form paths so that the data signal DQ is either transmitted or received via the eight first pins P11 through P14 and P16 through P19 respectively connected to the first through fourth interconnections INT1 through INT4 and the sixth through ninth interconnections INT6 through INT9. In addition, the second routing circuit 42_2b may form paths so that the data signal DQ is transmitted or received via the eight second pins P21 through P24 and P26 through P29 respectively connected to the first through fourth interconnections INT1 through INT4 and the sixth through ninth interconnections INT6 through INT9.

As illustrated in FIG. 4B, the first routing circuit 41_2b may include eight first unit circuits U11 through U18 respectively corresponding to the first through eighth data signals DQ1 through DQ8 of the data signal DQ. As illustrated by solid lines in FIG. 4B, the eight first unit circuits U11 through U18 may output the data signal DQ to the eight first pins P11 through P14 and P16 through P19, or may receive the data signal DQ from the eight first pins P11 through P14 and P16 through P19. Similarly, the second routing circuit 42_2b may include eight second unit circuits U21 through U28 respectively corresponding to the first through eighth data signals DQ1 through DQ8 of the data signal DQ, and the eight second unit circuits U21 through U28 may output the data signal DQ to the eight second pins P21 through P24 and P26 through P29, respectively, or receive the first through eighth data signals DQ1 through DQ8 from the eight second pins P21 through P24 and P26 through P29, respectively. Accordingly, the fifth interconnection INT5 may not be used, and the first pin P15 and the second pin P25 connected to the fifth interconnection INT5 may not be used.

Figure 5:
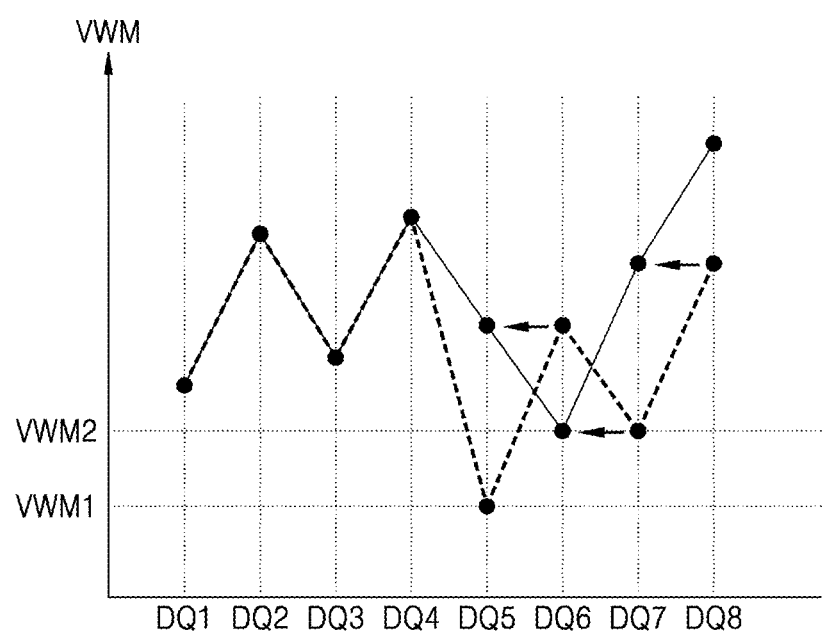
FIG. 5 is a graph of a training result of a physical interface, according to at least one example embodiment of the inventive concepts.

FIG. 5 is a graph of a training result of a physical interface, according to at least one example embodiment of the inventive concepts. In the graph of FIG. 5, the dashed line may represent the training result of FIG. 4A, and the solid line may represent the training result of FIG. 4B. Hereinafter, FIG. 5 will be described with reference to FIGS. 4A and 4B.

As described above with reference to FIG. 4A, the training may be performed by using the first through eighth interconnections INT1 through INT8, and accordingly, as illustrated by the dashed line in FIG. 5, eight valid window margins VWM respectively corresponding to the first through eighth data signals DQ1 through DQ8. As illustrated in FIG. 5, a first valid window margin VWM1 of the fifth data signal DQ5 among eight valid window margins may be identified as the minimum valid window margin, and the first valid window margin VWM1 may be determined as the valid window margin of the physical interface using the first candidate group of the interconnections, that is, the first through eighth interconnections INT1 through INT8.

In some embodiments, for a subsequent training, the candidate group may be selected among the interconnections except for the interconnections corresponding to the minimum valid window margin. For example, when a training result such as indicated by the dashed line in FIG. 5 occurs, the interconnections except for the interconnection corresponding to the fifth data signal DQ5, that is, the first through fourth interconnections INT1 through INT4 and the sixth through ninth interconnections INT6 through INT9 excluding the fifth interconnection INT5, may be selected as the second candidate group. Accordingly, as described above with reference to FIG. 4B, a training may be performed by using the first through fourth interconnections INT1 through INT4 and the sixth through ninth interconnections INT6 through INT9, and as illustrated by the dashed line in FIG. 5, eight the valid window margins respectively corresponding to the eight of the first through eighth data signals DQ1 through DQ8 of data signal DQ may be obtained. As illustrated by arrows in FIG. 5, the valid window margins corresponding to the fifth through seventh data signals DQ5 through DQ7 may correspond to the valid window margins corresponding to the sixth through eighth data signals DQ6 through DQ8 in the previous training. As illustrated in FIG. 5, a second valid window margin VWM2 of the sixth data signal DQ6 among eight valid window margins may be identified as the minimum valid window margin, and the second valid window margin VWM2 may be determined as the valid window margin of the physical interface using the second candidate group of the interconnections, that is, the first through fourth interconnections INT1 through INT4 and sixth through ninth interconnections INT6 through INT9.

As illustrated in FIG. 5, the second valid window margin VWM2 may be greater than the first valid window margin VWM1, and accordingly, the second candidate group including the first through fourth interconnections INT1 through INT4 and the sixth through ninth interconnections INT6 through INT9 may be determined as the interconnection group for the physical interface.

Figure 6:
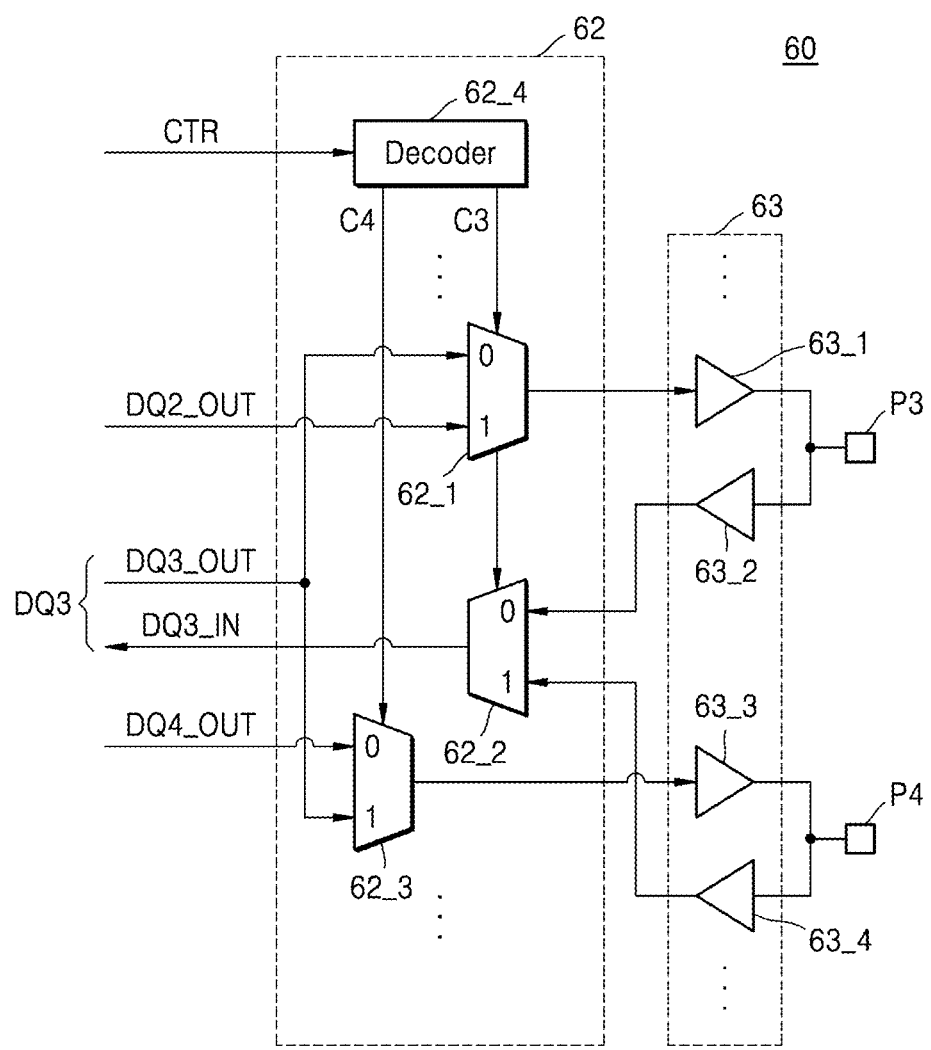
FIG. 6 is a block diagram of an apparatus according to at least one example embodiment of the inventive concepts.

FIG. 6 is a block diagram of an apparatus 60 according to at least one example embodiment of the inventive concepts. The block diagram of FIG. 6 illustrates a portion for adjusting a path for transmission/reception of the third data signal DQ3 in the apparatus 60. As described above with reference to FIG. 1, a routing circuit 62 may receive a control signal CTR, and form a path for transceiving the third data signal DQ3 according to the control signal CTR. As illustrated in FIG. 6, the apparatus 60 may include the routing circuit 62, input/output (I/O) buffers 63, and a third pin P3 and a fourth pin P4, and the third data signal DQ3 may include a third data output signal DQ3_OUT and a third data input signal DQ3_IN.

The routing circuit 62 may include a decoder 62_4 and a plurality of multiplexers. The decoder 62_4 may receive the control signal CTR, and may generate a plurality of select signals for controlling the plurality of multiplexers by decoding the control signal CTR. For example, as illustrated in FIG. 6, the routing circuit 62 may include a first multiplexer 62_1 and a third multiplexer 62_3 for receiving the third data output signal DQ3_OUT, and may include a second multiplexer 62_2 outputting the third data input signal DQ3_IN. The first multiplexer 62_1 may provide one of a second data output signal DQ2_OUT and the third data output signal DQ3_OUT to a first output buffer 63_1, based on a third select signal C3 provided by the decoder 62_4. The second multiplexer 62_2 may output a signal output from one of a first input buffer 63_2 and a second input buffer 63_4 as the third data input signal DQ3_IN, based on the third select signal C3 from the decoder 62_4. Accordingly, when the third select signal C3 is deactivated (for example, has a low level), the third data output signal DQ3_OUT may be output by sequentially passing through the first multiplexer 62_1, the first output buffer 63_1, and the third pin P3, and a signal input via the third pin P3 may be received as the third data input signal DQ3_IN via the first input buffer 63_2 and the second multiplexer 62_2. On the other hand, when the third select signal C3 is activated (for example, has a high level), the third data output signal DQ3_OUT may be output by sequentially passing through the third multiplexer 62_3, a second output buffer 63_3, and the fourth pin P4, and a signal input via the fourth pin P4 may be received as the third data input signal DQ3_IN via the second input buffer 63_4 and the second multiplexer 62_2. In addition, the third multiplexer 62_3 may provide one of the third data output signal DQ3_OUT and a fourth data output signal DQ4_OUT to the second output buffer 63_3, based on a fourth select signal C4 provided by the decoder 62_4.

Figure 7:
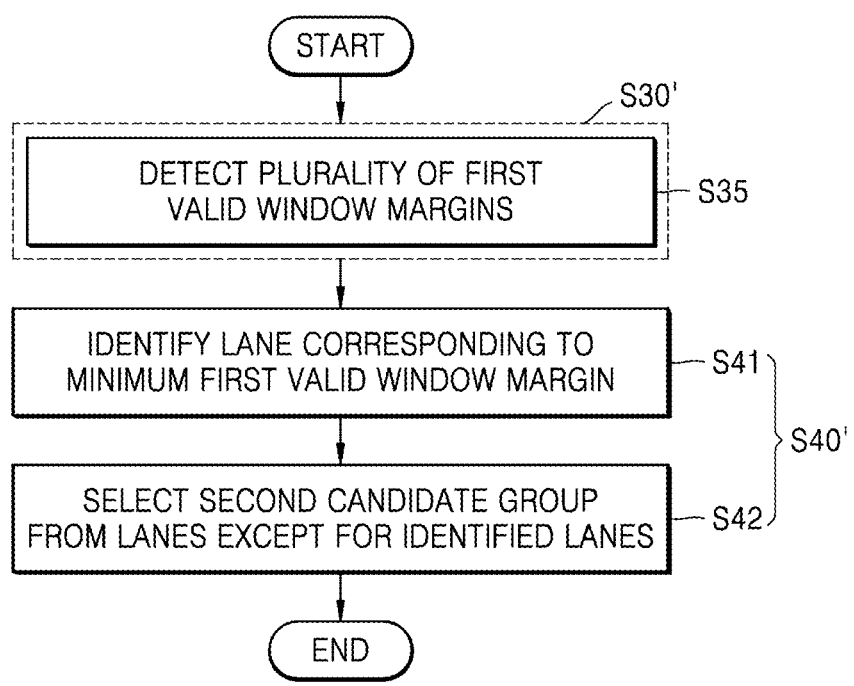
FIG. 7 is a flowchart of a method of training a physical interface, according to at least one example embodiment of the inventive concepts.

FIG. 7 is a flowchart of a method of training a physical interface, according to at least one example embodiment of the inventive concepts. The flowchart of FIG. 7 illustrates examples of operations S30 and S40 in FIG. 2. As described above with reference to FIG. 2, the first training of the physical interface may be performed in operation S30' of FIG. 7, and the second candidate group among the valid lanes may be selected in operation S40' of FIG. 7. As illustrated in FIG. 7, operation S30' may include operation S35, and operation S40' may include operation S41 and operation S42. Hereinafter, FIG. 7 will be described with reference to FIG. 2.

Referring to FIG. 7, a plurality of first valid window margins may be detected in operation S35. For example, the first device 21 may detect the plurality of first valid window margins respectively corresponding to a plurality of lanes included in the first candidate group as the result of the first training. As described above with reference to FIG. 5, the minimum first valid window margin VWM1 among the plurality of first valid window margins may be determined as the valid window margin of the physical interface using the first candidate group.

A lane corresponding to the minimum first valid window margin VWM1 may be identified in operation S41. For example, the first device 21 may identify the minimum first valid window margin VWM1 among the plurality of first valid window margins detected in operation S35, and identify a lane corresponding to the minimum first valid window margin VWM1. Accordingly, as described above with reference to FIGS. 4A and 5, a lane including the fifth interconnection INT5 may be identified.

The second candidate group may be selected from lanes except for the identified lane in operation S42. For example, the first device 21 may select the second candidate group among the valid lanes except for the lane identified in operation S41. Accordingly, as described above with reference to FIGS. 4B and 5, the lane including the fifth interconnection INT5 may be excluded, and the second candidate group including the lanes respectively including the first through fourth interconnections INT1 through INT4 and the sixth through ninth interconnections INT6 through INT9 may be selected.

Figure 8:
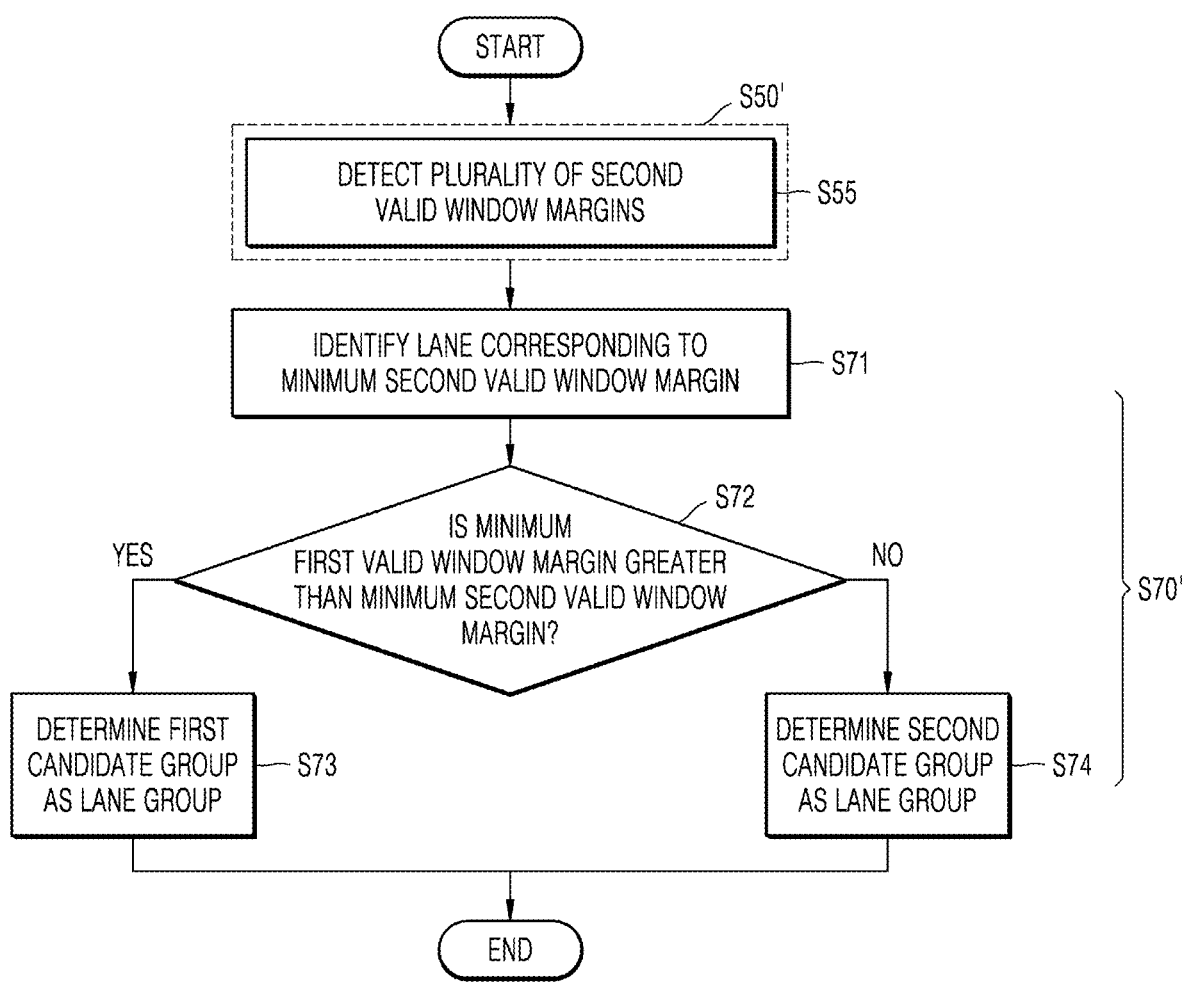
FIG. 8 is a flowchart of a method of training a physical interface, according to at least one example embodiment of the inventive concepts.

FIG. 8 is a flowchart of a method of training a physical interface, according to at least one example embodiment of the inventive concepts. The flowchart of FIG. 8 may illustrate examples of operations S50 and S70 in FIG. 2. As described above with reference to FIG. 2, the second training of the physical interface may be performed in operation S50' of FIG. 8, and the lane group including the lanes to be used at the physical interface may be determined in operation S70' of FIG. 8. As illustrated in FIG. 8, operation S50' may include operation S55, and operation S70' may include a plurality of operations S71 through S74.

The plurality of second valid window margins may be detected in operation S55. For example, the first device 21 may detect a plurality of second valid window margins respectively corresponding to a plurality of lanes included in the second candidate group as the result of the second training. As described above with reference to FIG. 5, a minimum second valid window margin VWM2 among the plurality of second valid window margins may be determined as the valid window margin of the physical interface using the second candidate group.

A lane corresponding to the minimum second valid window margin VWM2 may be identified in operation S71. For example, the first device 21 may identify the minimum second valid window margin VWM2 among the plurality of second valid window margins detected in operation S55, and identify a lane corresponding to the minimum second valid window margin VWM2. Accordingly, as described above with reference to FIGS. 4B and 5, a lane including the sixth interconnection INT6 may be identified.

The minimum first valid window margin VWM1 may be compared to the minimum second valid window margin VWM2 in operation S72. As illustrated in FIG. 8, when the minimum first valid window margin VWM1 is greater than the minimum second valid window margin VWM2, the first candidate group may be determined as the lane group in operation S73. On the other hand, when the minimum first valid window margin VWM1 is not greater than the minimum second valid window margin VWM2, the second candidate group may be determined as the lane group in operation S74. As a result, the first device 21 may identify a higher valid window margin among the minimum first valid window margin VWM1 and the minimum second valid window margin VWM2, and identify, as a lane group, a candidate group corresponding to the valid window margin that has been identified among the first candidate group and the second candidate group in operation S70'.

Figure 9A:
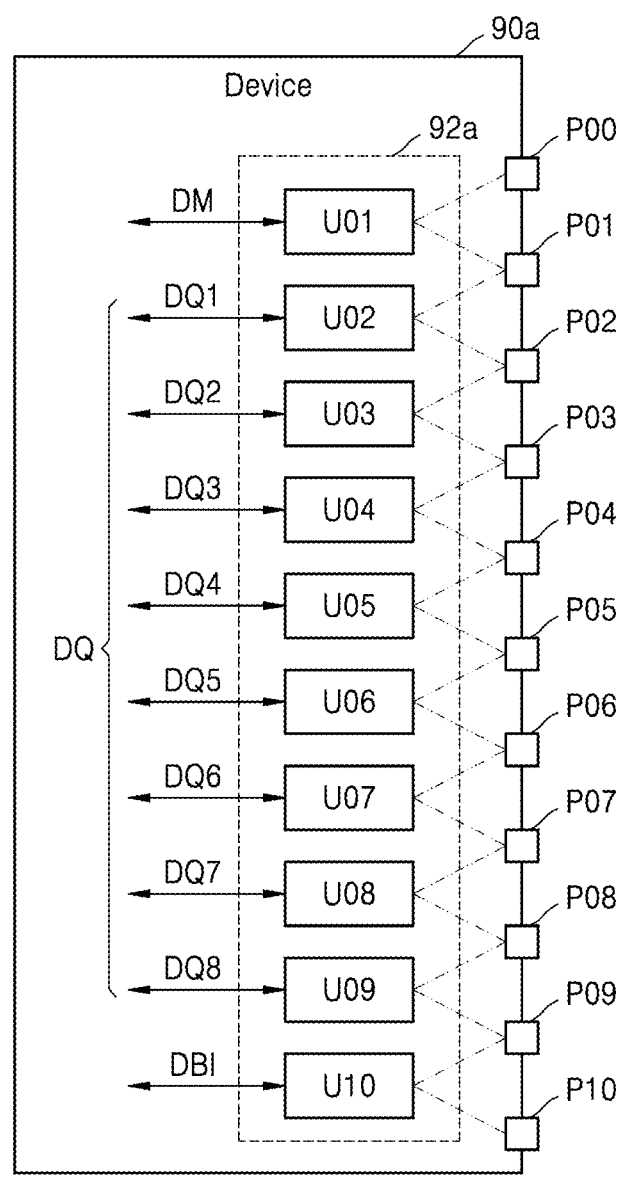
FIGS. 9A and 9B are block diagrams of examples of an apparatus, according to at least some example embodiments of the inventive concepts.
Figure 9B:
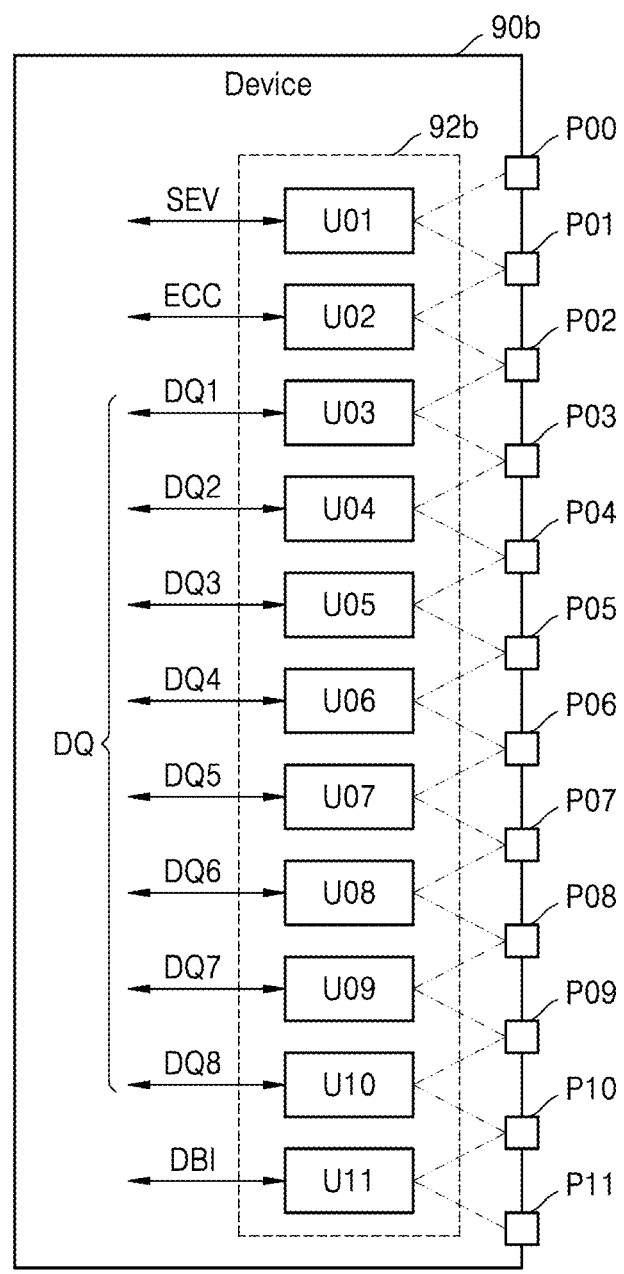

FIGS. 9A and 9B are block diagrams of examples of apparatuses, according to at least some example embodiments of the inventive concepts. Compared to the devices of FIGS. 4A and 4B, devices 90a and 90b of FIGS. 9A and 9B, respectively, may transceive the data signal DQ as well as additional signals. In some embodiments, the data signal DQ and other signals may be mapped to the plurality of pins differently from as illustrated in FIGS. 9A and 9B. The signals illustrated together with the data signal DQ in FIGS. 9A and 9B are only examples, and unused pins corresponding to signals different from the signals illustrated in FIGS. 9A and 9B may be used for better valid window margins. Hereinafter, duplicate descriptions to be given with reference to FIGS. 9A and 9B are omitted.

Referring to FIG. 9A, the device 90a may include a routing circuit 92a and a plurality of pins P00 through P10. The device 90a may transceive the data signal DQ as well as the data mask signal DM and the data bus inversion signal DBI. The data mask signal DM may indicate whether at least a portion of the data signal DQ is masked. For example, when the activated data mask signal DM is received together with the data signal DQ, the device 90a may ignore lower 4 bits, that is, the first through fourth digital signals DQ1 through DQ4 of the first through eighth data signals DQ1 through DQ8 of the data signal DQ. In this manner, masking at least a portion of the data signal DQ by using the data mask signal DM may be referred to as a data masking function, and the physical interface may support the data masking function.

The data bus inversion signal DBI may indicate whether the data signal DQ is inverted. For example, when an activated data bus inversion signal DBI is received together with the data signal DQ, the device 90a may invert the data signal DQ, and extract information from the inverted data signal DQ. Due to the data bus inversion signal DBI, transitions of the signals at the interconnections may decrease or the number of signals having a high level may decrease, and accordingly, power consumed for communication may decrease. In this manner, selectively inverting the data signal DQ by using the data bus inversion signal DBI may be referred to as a data bus inversion function, and the physical interface may support the data bus inversion function.

The data masking function and/or the data bus inversion function may be disabled in the device 90a. In some embodiments, the device 90a and another device in communication with the device 90a may be preset, so that the data masking function and/or data bus inversion function are not used. Accordingly, when the data masking function and/or the data bus inversion function are not used, the data mask signal DM and/or the data bus inversion signal DBI may also not be used, and the number of available lanes for transceiving the data signal DQ may increase.

As illustrated in FIG. 9A, the routing circuit 92a may include ten of unit circuits U01 through U10 respectively corresponding to the data mask signal DM, the data signal DQ having 8 bits, and the data bus inversion signal DBI, and may include eleven of pins P00 through P10. In some embodiments, when the data masking function is deactivated, ten of pins P01 through P10 of the eleven of pins P00 through P10 may be used for the data signal DQ having 8 bits and the data bus inversion signal DBI, and accordingly, ten different candidate groups may be available and ten trainings respectively corresponding to the ten different candidate groups may be performed. Similarly, in some embodiments, when the data masking function is deactivated, ten of pins P00 through P09 of the eleven of pins P00 through P10 may be used for the data signal DQ having 8 bits and the data mask signal DM, and accordingly, ten different candidate groups may be available and ten trainings respectively corresponding to the ten different candidate groups may be performed. In addition, in some embodiments, when the data masking function and the data bus conversion function are all deactivated, nine of pins P01 through P09 of the eleven of pins P00 through P11 may be used for the data signal DQ having 8 bits, and accordingly, nine different candidate groups may be available and nine trainings respectively corresponding to the nine different candidate groups may be performed. In this manner, a candidate group including pins that are not used as a result of the function being in a deactivated state may be selected.

Referring to FIG. 9B, the device 90b may include a routing circuit 92b and the plurality of pins P00 through P10. The device 90b may transmit or receive the data signal DQ as well as the data bus inversion signal DBI, a severity signal SEV, and an error correction code signal ECC. In some embodiments, unlike as illustrated in FIG. 9B, the severity signal SEV and the error correction code signal ECC may be arranged for each data signal having 16 bits.

The severity signal SEV and the error correction code signal ECC may be used for the error correction code (or on-die) of data transceived via the data signal DQ. The data bus inversion function as well as the error correction function may be at least partially disabled in the device 90b. In some embodiments, the device 90b and another device in communication with the device 90b may be preset, so that at least a portion of the error correction function is not used. Accordingly, when at least a portion of the error correction function is not used, the severity signal SEV and/or the error correction code signal ECC may also not be used, and the number of available lanes for transmission and reception of the data signal DQ may increase.

As illustrated in FIG. 9B, the routing circuit 92b may include eleven of unit circuits U01 through U11 respectively corresponding to the severity signal SEV, the error correction code signal ECC, the data signal DQ having 8 bits, and the data bus inversion signal DBI, and may include twelve of pins P00 through P11. When at least one of functions respectively corresponding to the data bus inversion signal DBI, the severity signal SEV, and/or the error correction code signal ECC is deactivated, only some of the twelve of pins P00 through P11 may be required, and accordingly, different candidate groups may be available, and trainings corresponding to the related candidate groups may be performed. As described above with reference to FIG. 9A, a candidate group including pins that are not used due to the deactivated function may be selected.

Figure 10:
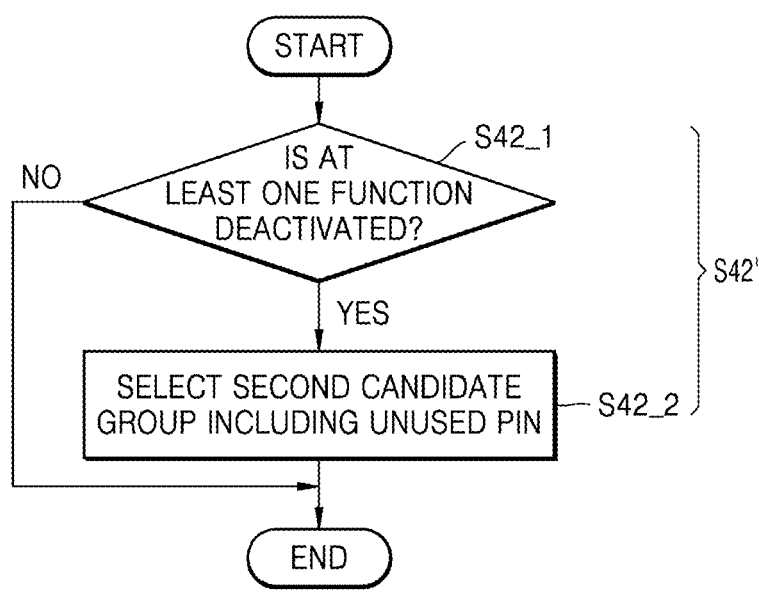
FIG. 10 is a flowchart of a method of training a physical interface, according to at least one example embodiment of the inventive concepts.

FIG. 10 is a flowchart of a method of training a physical interface, according to at least one example embodiment of the inventive concepts. The flowchart of FIG. 10 may illustrate an example of operation S42 in FIG. 7. As described above with reference to FIG. 7, after the first training is completed, the second candidate group may be selected in operation S42' of FIG. 10. As illustrated in FIG. 10, operation S42' may include operations S42_1 and S42_2, and hereinafter, FIG. 10 will be described with reference to FIGS. 7 and 9A.

Referring to FIG. 10, whether at least one function is deactivated may be determined in operation S42_1. For example, each of the first device 11 and the second device 12 in FIG. 1 may include a mode register that stores whether functions supported by the physical interface are activated. The first controller 11_1 may access the mode register, and may determine whether at least one function is deactivated based on a value stored in the mode register. As illustrated in FIG. 10, when at least one function is deactivated, operation S42_2 may be subsequently performed.

The second candidate group including unused pins may be selected in operation S42_2. For example, the first controller 11_1 in FIG. 1 may identify at least one deactivated function, and identify at least one pin corresponding to the at least one identified function, that is, at least one unused pin. The first controller 11_1 may select the second candidate group including at least one unused pin instead of at least one pin included in the first candidate group which is used in the previous training (that is, the first training).

Figure 11:
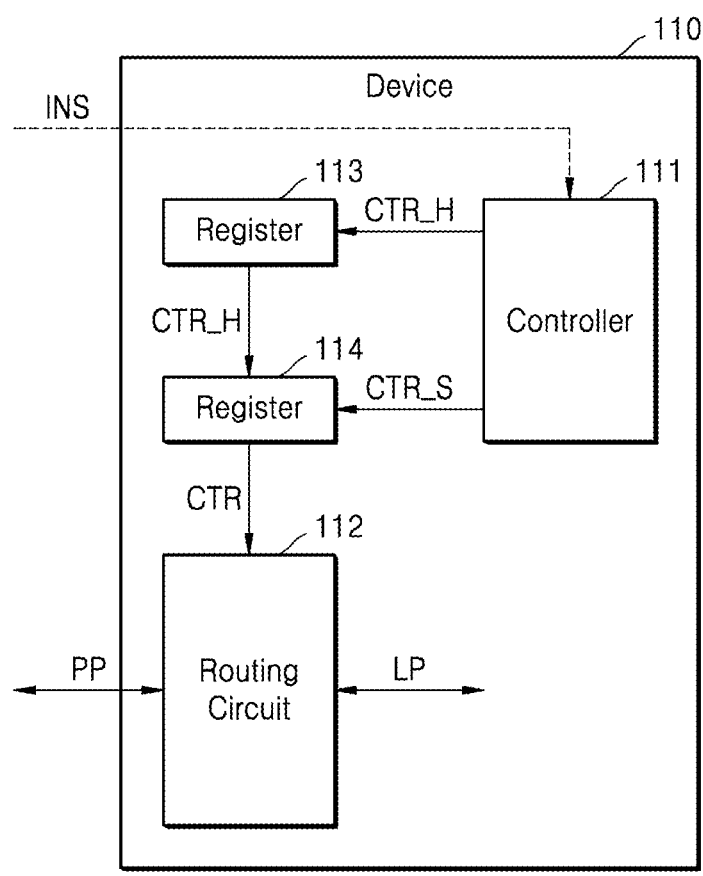
FIG. 11 is a block diagram of an apparatus according to at least one example embodiment of the inventive concepts.

FIG. 11 is a block diagram of a device 110 according to at least one example embodiment of the inventive concepts. The block diagram of FIG. 11 illustrates an example of a device (for example, 12 in FIG. 1) that sets the candidate group of the lanes, and communicates with a device (for example, 11 in FIG. 1) that finally determines the lane group. As illustrated in FIG. 11, the device 110 may include a controller 111, a routing circuit 112, a first register 113, and a second register 114. Hereinafter, it is assumed that the device 110 of FIG. 11 communicates with the first device 11 in FIG. 1.

As described above with reference to the drawings, the routing circuit 112 may form paths based on the control signal CTR. Accordingly, the routing circuit 112 may map logical paths LP to physical paths PP based on the control signal CTR. As illustrated in FIG. 11, the control signal CTR may be provided by the second register 114.

The controller 111 may receive an instruction INS from the first device 11 (or the first controller 11_1), and may generate a hard control signal CTR_H or a soft control signal CTR_S based on the instruction INS. The instruction INS received from the first device 11 may include a soft mapping command for temporarily mapping the logical paths LP to the physical paths PP and a hard mapping command for permanently mapping the logical paths LP to the physical paths PP. The controller 111 may provide the hard control signal CTR_H to the first register 113 based on the hard mapping command, and the soft control signal CTR_S to the second register 114 based on the soft mapping command.

The first register 113 may, in a non-volatile manner, store a value corresponding to the hard control signal CTR_H provided by the controller 111, and may provide the stored value corresponding to hard control signal CTR_H to the second register 114. The second register 114 may store one of a value corresponding to the hard control signal CTR_H provided by the first register 113 and a value corresponding to the soft control signal CTR_S provided by the controller 111, and may provide the stored control signal CTR corresponding to the store value to the routing circuit 112. In some embodiments, the second register 114 may be referred to as a shadow register. An example of a method of setting the candidate group used for the training and a finally determined lane group, by using the first register 113 and the second register 114 will be described later with reference to FIG. 12. In some embodiments, the first register 113 and the second register 114 may be used for the lane repair.

Figure 12:
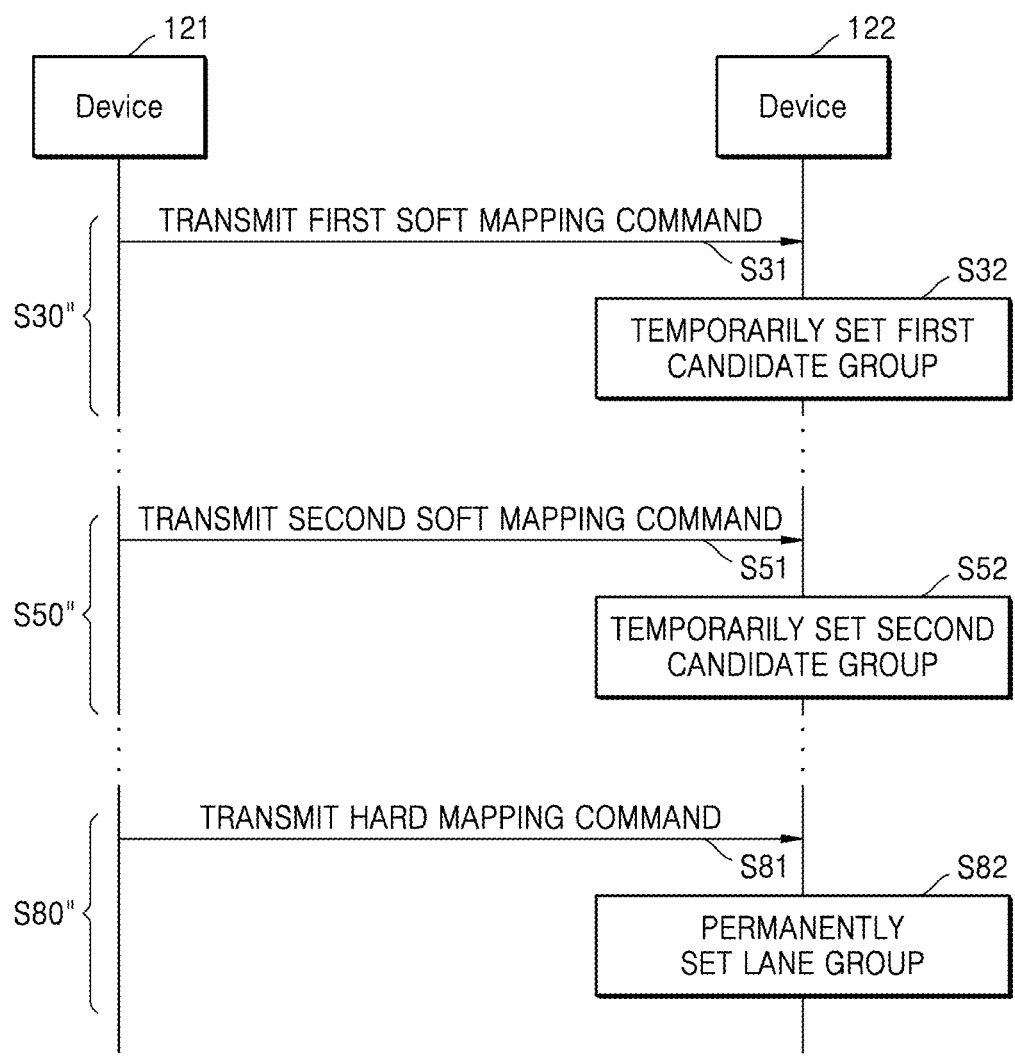
FIG. 12 is a flowchart of a method of training a physical interface, according to at least one example embodiment of the inventive concepts.

FIG. 12 is a flowchart of a method of training a physical interface, according to at least one example embodiment of the inventive concepts. The flowchart of FIG. 12 illustrates examples of operations S30, S50, and S80 in FIG. 2. As described above with reference to FIG. 2, the first training may be performed in operation S30" of FIG. 12, the second training may be performed in operation S50" of FIG. 12, and the lane group may be formed in operation S80" of FIG. 12. As illustrated in FIG. 12, operation S30" may include operations S31 and S32, operation S50" may include operations S51 and S51, and operation S80" may include operations S81 and S82. Hereinafter, FIG. 12 will be described with reference to FIG. 11, and a second device 122 in FIG. 12 may include the controller 111, the routing circuit 112, the first register 113, and the second register 114.

Referring to FIG. 12, a first device 121 may transmit a first soft mapping command to the second device 122 in operation S31. For example, the first device 121 may select the first candidate group for the first training, and may transmit the first soft mapping command to the second device 122 as information about the selected first candidate group.

The second device 122 may temporarily set the first candidate group in operation S32. For example, the controller 111 included in the second device 122 may provide the soft control signal CTR_S for setting the first candidate group to the second register 114 in response to the first soft mapping command, and the second register 114 may provide the control signal CTR corresponding to the soft control signal CTR_S to the routing circuit 112. Accordingly, the first training using the first candidate group may be performed.

The first device 121 may transmit a second soft mapping command to the second device 122 in operation S51. For example, the first device 121 may select the second candidate group for the second training, and may transmit the second soft mapping command to the second device 122 as information about the selected second candidate group.

The second device 122 may temporarily set the second candidate group in operation S52. For example, the controller 111 included in the second device 122 may provide the soft control signal CTR_S for setting the second candidate group to the second register 114 in response to the second soft mapping command, and the second register 114 may provide the control signal CTR corresponding to the soft control signal CTR_S to the routing circuit 112. Accordingly, the second training using the second candidate group may be performed.

The first device 121 may transmit the hard mapping command to the second device 122 in operation S81. For example, the first device 121 may finally determine the lane group based on the training results, and may transmit the hard mapping command to the second device 122 as information about the determined lane group.

The second device 122 may permanently set the lane group in operation S82. For example, the controller 111 included in the second device 122 may provide the hard control signal CTR_H for setting the lane group to the first register 113 in response to the hard mapping command, and the first register 113 may store the hard control signal CTR_H in a non-volatile manner. When the controller 111 does not provide the soft control signal CTR_S to the second register 114, the second register 114 may provide the control signal CTR corresponding to the hard control signal CTR_H provided by the first register 113 to the routing circuit 112. Accordingly, the first device 121 and the second device 122 may communicate with each other based on the physical interface by using the determined lane group.

Figure 13:
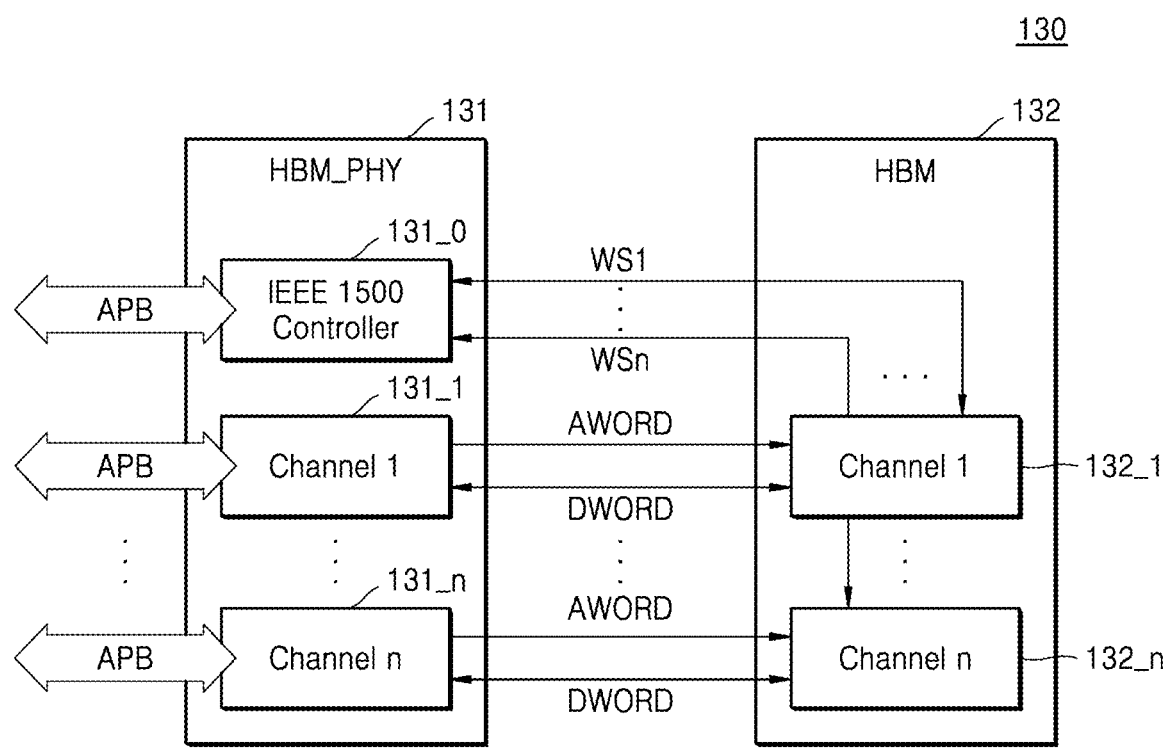
FIG. 13 is a diagram of a system according to at least one example embodiment of the inventive concepts.

FIG. 13 is a diagram of a system 130 according to at least one example embodiment of the inventive concepts. As illustrated in FIG. 13, the system 130 may include a high bandwidth memory (HBM) 132 and an HBM physical layer (PHY) (HBM_PHY) 131 communicating with the HBM 132, and may be referred to as a memory system, a memory module, or the like. The HBM_PHY 131 and the HBM 132 may communicate with each other based on an HBM interface as the physical interface, and may perform a training of the HBM interface as described above with reference to the drawings.

Referring to FIG. 13, the HBM_PHY 131 may include an institute of electrical and electronics engineers (IEEE) 1500 controller 131_0 and first through $n^{th}$ channels 131_1 through 131_n (n is an integer greater than 1). The first through $n^{th}$ channels 131_1 through 131_n may communicate with the HBM 132 independently of each other, and to this end, the HBM 132 may also include first through $n^{th}$ channels 132_1 through 132_n. As illustrated in FIG. 13, each of the first through nth channels 131_1 through 131_n may receive data from a host (or a memory controller) via an advanced peripheral bus (APB) or transmit data to the host. In addition, each of the first through $n^{th}$ channels 131_1 through 131_n may communicate with a channel corresponding to the HBM 132 via a first sub-channel (AWORD) for transmission of commands and/or addresses, and a second sub-channel (DWORD) for transmission and reception of data. An example of the first through $n^{th}$ channels 131_1 through 131_n will be described later with reference to FIG. 14.

The IEEE 1500 controller 131_0 may provide a direct connection between the host and the HBM 132. As illustrated in FIG. 13, the IEEE 1500 controller 131_0 may receive data from or transmit data to the host via an advanced peripheral bus (APB), and the IEEE 1500 controller 131_0 may communicate with the HBM 132 via independent channels WS1 through WSn. In some embodiments, the IEEE 1500 controller 131_0 may provide information to the HBM 132 for setting the HBM 132 when training the first sub-channel (AWORD) of the first through $n^{th}$ channels 131_1 through 131_n is performed, and may receive information about signals received via the first through $n^{th}$ channels 132_1 through 132_n, that is, a feedback of the training from the HBM 132. For example, as described above with reference to the drawings, the IEEE 1500 controller 131_0 may control the training by using each of different candidate groups for the first sub-channel (AWORD), and may determine the lane group for the first sub-channel (AWORD) based on the training results.

The HBM 132 may include a plurality of memory dies that are stacked, and via the first through nth channels 132_1 through 132_n, data may be written to the plurality of memory dies in parallel or data may be read from the plurality of memory dies in parallel. In some embodiments, the HBM 132 may include a plurality of DRAM dies, and may be referred to as HBM DRAM. An example of a structure of the HBM 132 will be described later with reference to FIG. 15.

Figure 14:
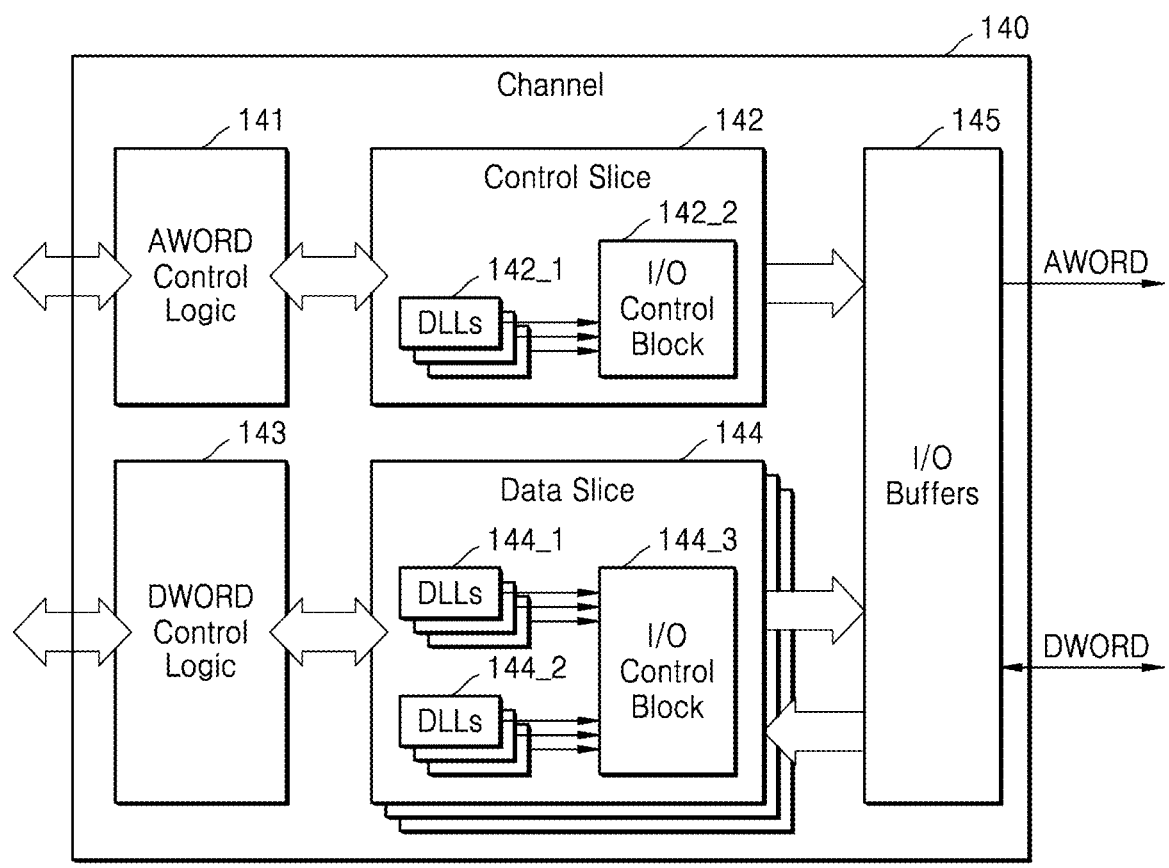
FIG. 14 is a block diagram of a channel according to at least one example embodiment of the inventive concepts.

FIG. 14 is a block diagram of a channel 140 according to at least one example embodiment of the inventive concepts. As described above with reference to FIG. 13, the HBM- _PHY 131 may include a plurality of channels, and the plurality of channels may communicate with the HBM 132 independently of each other. As illustrated in FIG. 14, a channel 140 may include an AWORD control logic 141, a control slice 142, a DWORD control logic 143, a plurality of data slices 144, and input/output (I/O) buffers 145.

The AWORD control logic 141 may communicate with the host, and control the control slice 142. For example, the AWORD control logic 141 may provide a command and/or an address to the control slice 142 in response to the command (for example, a write command and a read command) and/or the address, which are received from the host via the APB and/or the double data rate (DDR) physical interface (DFI). In addition, the AWORD control logic 141 may generate a test pattern when training the first sub-channel AWORD is performed, and may adjust the timing of signals output via the first sub-channel AWORD by controlling a plurality of delay locked loops (DLLs) 142_1 included in the control slice 142 in FIG. 14.

The control slice 142 may include the plurality of DLLs 142_1 and an input/output (I/O) control block 142_2. The plurality of DLLs 142_1 may provide signals delayed according to the control of the AWORD control logic 141, such as a command signal and/or an address signal, to the I/O control block 142_2. The I/O control block 142_2 may provide, to the I/O buffers 145, the command signal and/or the address signal received from the plurality of DLLs 142_1 via paths formed according to the control of the AWORD control logic 141 (or 131_0 in FIG. 13). In other words, the I/O control block 142_2 may perform the function of the routing circuits described above with reference to the drawings.

The DWORD control logic 143 may communicate with the host, and control the plurality of data slices 144. For example, the DWORD control logic 143 may provide data to the plurality of data slices 144 in response to data received from the host via the APB and/or DFI. The DWORD control logic 143 may generate a test pattern when training a write path of the second sub-channel DWORD is performed, and may adjust timing of signals output via the second sub-channel DWORD by controlling a plurality of first DLLs 144_1 included in each of the data slices 144 in FIG. 14. In addition, the DWORD control logic 143 may provide data received from the plurality of data slices 144 to the host via the APB and/or DFI. The DWORD control logic 143 may control the timing of signals received via the second sub-channel DWORD by controlling a plurality of second DLLs 144_2 when training the read path of the second sub-channel DWORD is performed.

Each of the plurality of data slices 144 may include the plurality of first DLLs 144_1, the plurality of second DLLs 144_2, and an input/output (I/O) control block 144_3. The plurality of first DLLs 144_1 may provide signals delayed according to the control of the DWORD control logic 143, for example, data signals, to the I/O control block 144_3. The I/O control block 144_3 may provide a data signal received from the plurality of first DLLs 144_1 via paths formed according to the control of the DWORD control logic 143, to the I/O buffer 145. In addition, the plurality of second DLLs 144_2 may provide signals delayed according to the control of the DWORD control logic 143, for example, data signals, to the DWORD control logic 143. The I/O control block 144_3 may provide a data signal received from the input/output (I/O) buffers 145 via paths formed according to the control of the DWORD control logic 143, to the plurality of second DLLs 144_2. Accordingly, the I/O control block 144_3 may perform the function of the routing circuits described above with reference to the drawings.

Figure 15:
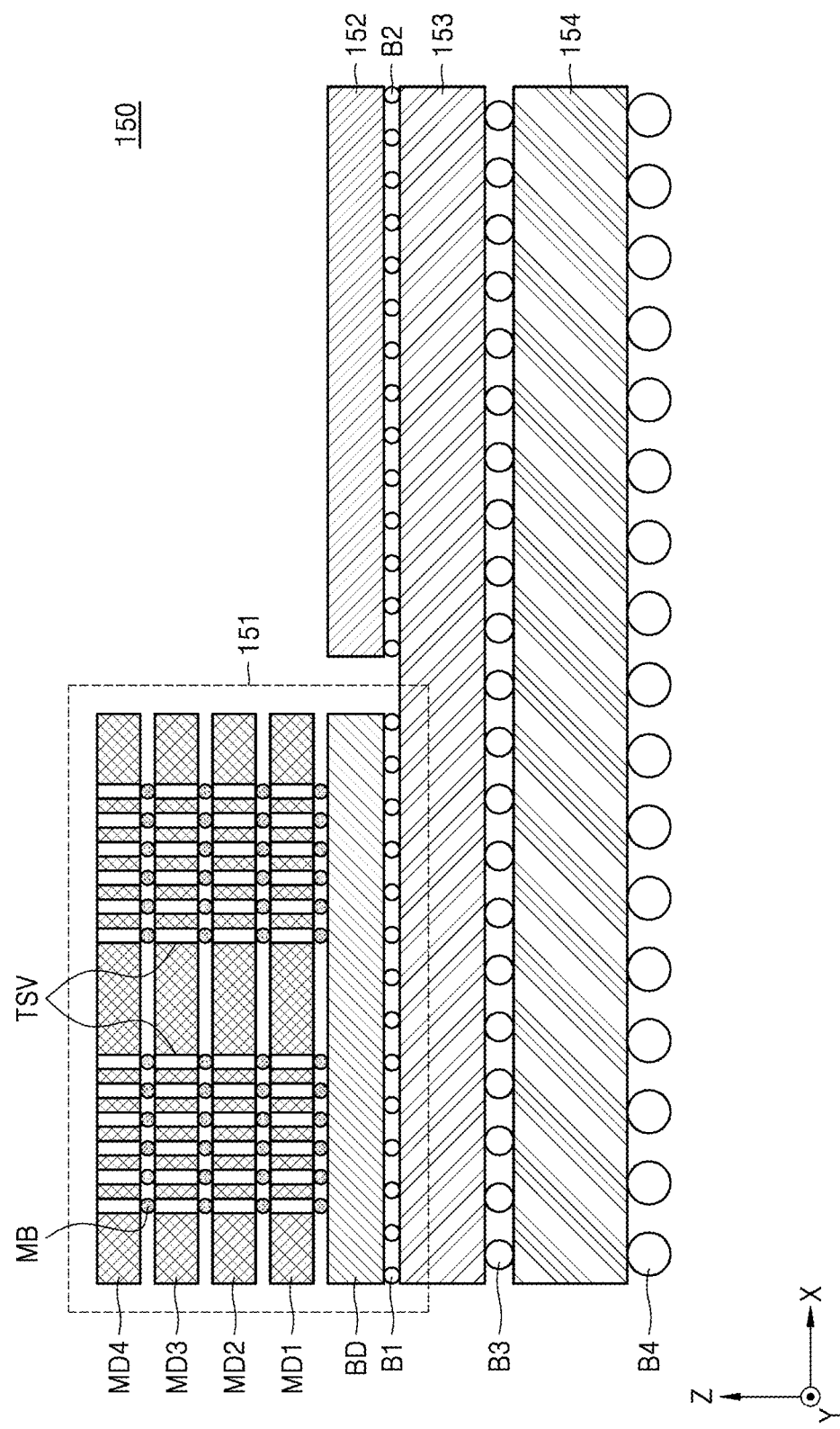
FIG. 15 is a diagram of a cross-sectional view of a system according to at least one example embodiment of the inventive concepts.

FIG. 15 is a diagram of a cross-sectional view of a system 150 according to at least one example embodiment of the inventive concepts. As illustrated in FIG. 15, the system 150 may include an HBM device 151, a processing circuit 152, an interposer 153, and a printed circuit board (PCB) 154.

The HBM device 151 may include first through fourth memory dies MD1 through MD4 and a base die BD, and may be referred to as an HBM system. As illustrated in FIG. 15, the first through fourth memory dies MD1 through MD4 may be stacked on the base die BD, and micro-bumps MB may be arranged between the first through fourth memory dies MD1 through MD4 and the base die BD. The micro-bumps MB may be connected to through silicon vias TSV penetrating each of the first through fourth memory dies MD1 through MD4. The base die BD may be arranged on the interposer 153, and first bumps B1 may be arranged between the base die BD and the interposer 153. An address signal, a command signal, and a data signal for accessing the first through fourth memory dies MD1 through MD4 may pass through the first bumps B1. In some embodiments, the first through fourth memory dies MD1 through MD4 may be collectively referred to as the HBM, and the HBM_PHY described above with reference to FIGS. 13 and 14 may be included in the base die BD. The HBM_PHY and the first through fourth memory dies MD1 through MD4 may perform a training by using each of different candidate groups of lanes based on the HBM interface, and may determine the lane group. Accordingly, some of a plurality of through silicon vias TSV and some of the plurality of micro-bumps MB, which provide an optimum margin, may be used for the HBM interface.

The processing circuit 152 may be arranged on the interposer 153, and second bumps B2 may be arranged between the processing circuit 152 and the interposer 153. The processing circuit 152 may communicate with the base die BD via some of the second bumps B2, patterns formed on the interposer 153, and some of the first bumps B1, and may write data to the HBM device 151 or may read data from the HBM device 151. For example, the processing circuit 152 may include a central processing unit (CPU), a graphic processing unit (GPU), a neural processing unit (NPU), or the like.

The interposer 153 may be arranged on the PCB 154, and third bumps B3 may be arranged between the interposer 153 and the PCB 154. In some embodiments, the third bumps B3 may include flip die bumps. The interposer 153 may include a plurality of patterns for interconnecting the HBM device 151 to the processing circuit 152. Fourth bumps B4 may be arranged on a lower surface of the PCB 154, and the system 150 may communicate with the outside via the fourth bumps B4.

Figure 16:
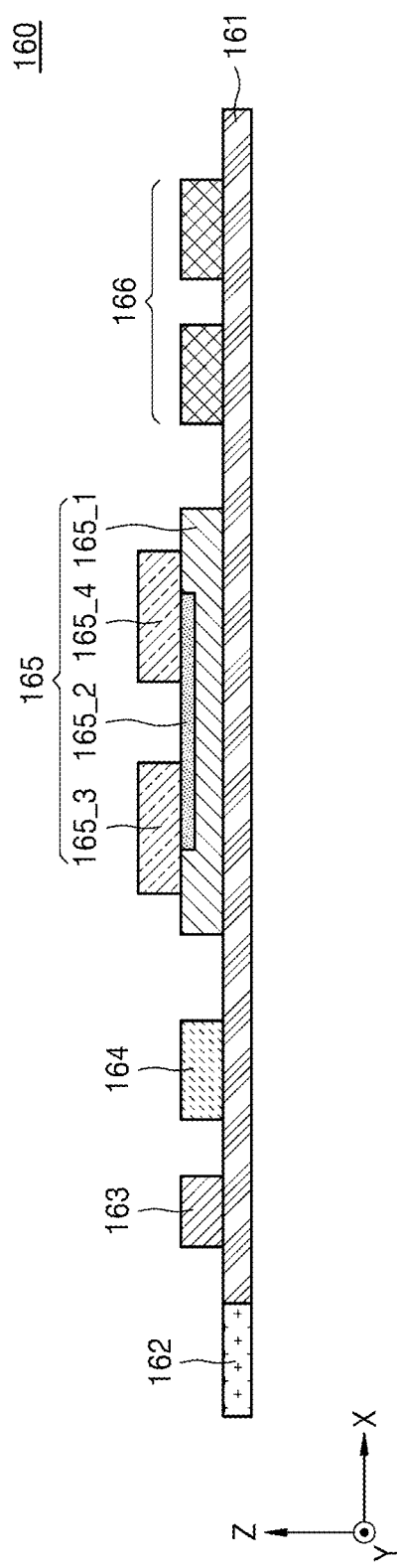
FIG. 16 is a diagram of a cross-sectional view of a system according to an embodiment of the inventive concepts.

FIG. 16 is a diagram of a cross-sectional view of a system 160 according to at least one example embodiment of the inventive concepts. As illustrated in FIG. 16, the system 160 may include a PCB 161, a connector 162, a discrete device 163, a power management integrated circuit (PMIC) 164, a control module 165, and memory devices 166. In some embodiments, the connector 162 is a part of the PCB 161. In some embodiments, the connector 162, the discrete device 163, the PMIC 164, the control module 165, and the memory devices 166 may be mounted on the PCB 161.

The connector 162 may be connected to a device outside the system 160. For example, the system 160 may be a memory system which stores data in the memory devices 166 or provides the stored data to the outside of the system 160 via the connector 162, in response to a signal provided via the connector 162. In some embodiments, the system 160 may include a solid state drive (SSD), and the connector 162 may have, as a non-limiting example, a structure defined by M.2 SSD and mini seral advanced technology attachment (mSATA) SSD. The memory devices 166 may store data under the control of the control module 165 to be described later. For example, the memory devices 166 may include at least one non-volatile memory device such as a flash memory and RRAM.

The discrete device 163 may provide a function for electrical characteristics required by the system 160. For example, the discrete device 163 may include a capacitor so that power provided via the connector 162 is stably provided to components included in the system 160. In addition, in some embodiments, the discrete device 163 may include a resistor and/or an inductor. The PMIC 165 may manage power provided to components of the system 160. For example, the PMIC 165 may receive a supply voltage via the connector 162, generate at least one supply voltage from the received supply voltage, and provide the generated at least one supply voltage to the components of the system 160.

The control module 165 may control the memory devices 166 in response to the signal received via the connector 162 or for itself. As illustrated in FIG. 16, the control module 165 may include a first interposer 165_1, a second interposer 165_2, a controller 165_3, and a buffer 165_4. The controller 165_3 may read data from the memory devices 166 or write data to the memory devices 166 in response to a request received via the connector 162. In some embodiments, the controller 165_3 may map logical addresses received via the connector 162 to physical addresses of the memory devices 166.

The buffer 165_4 may be used by the controller 165_3 to control the memory devices 166. For example, the buffer 165_4 may store data that is received via the connector 162 and will be written to the memory devices 166, and may also store data that is read by the memory devices 166 and will be output via the connector 162. In some embodiments, the buffer 165_4 may include a memory device (e.g., DRAM) having a faster operation speed than the memory devices 166.

The controller 165_3 and the buffer 165_4 may be connected to patterns of the PCB 161 via the first interposer 165_1. In addition, the controller 165_3 and the buffer 165_4 may be connected to each other via the second interposer 165_2. In some embodiments, unlike as illustrated in FIG. 16, the second interposer 165_2 may extend so that all of bottom surfaces of the controller 165_3 and the buffer 165_4 are disposed on the second interposer 165_2. In some embodiments, the controller 165_3 may perform training by using each of different candidate groups of lanes between the controller 165_3 and the buffer 165_4, and may determine a lane group. Thus, a portion of a plurality of lanes, which provide an optimum margin, may be used for an interface between the controller 165_3 and the buffer 165_4.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of training a physical interface between a first device and a second device, the method comprising:
   determining a timing of a signal transmission in a first candidate group, from a plurality of lanes between the first device and the second device, by performing a first training of the physical interface, the first training including temporarily setting the first candidate group and communicating a signal between the first device and the second device using the first candidate group of lanes from among the plurality of lanes;
   determining a timing of a signal transmission in a second candidate group, from the plurality of lanes between the first device and the second device, by performing a second training of the physical interface, the second training including temporarily setting the second candidate group and communicating a signal between the first device and the second device using the second candidate group of lanes from among the plurality of lanes, the second candidate group being different from the first candidate group;
   determining a lane group based on a comparison of the timings determined during the first training and the second training; and
   setting the second device so that the determined lane group is used for the physical interface,
   wherein the physical interface includes a high bandwidth memory (HBM) interface and the second device includes a plurality of memory dies that are stacked.

2. The method of claim 1, further comprising:
   selecting the second candidate group among the plurality of lanes based on a result of the first training.

3. The method of claim 2, wherein the performing of the first training comprises:
   detecting a plurality of first valid window margins, each valid window margin in the plurality of first valid window margins corresponding to a lane from among the lanes in the first candidate group, and wherein the selecting of the second candidate group comprises:
   identifying a first lane corresponding to a minimum first valid window margin of the plurality of first valid window margins; and
   selecting lanes from among the plurality of lanes excluding the first lane as the second candidate group.

4. The method of claim 3, wherein the performing of the second training comprises:
   detecting a plurality of second valid window margins, each valid window margin in the plurality of second valid window margins corresponding to a lane from among the lanes in the second candidate group, and wherein the determining of the lane group comprises:
   identifying a second lane corresponding to a minimum second valid window margin of the plurality of second valid window margins;
   identifying a higher valid window margin among the minimum first valid window margin and the minimum second valid window margin; and
   selecting a candidate group corresponding to the identified valid window margin among the first candidate group and the second candidate group, as the determined lane group.

5. The method of claim 2, wherein the selecting of the second candidate group comprises:
   identifying deactivation of at least one function of the physical interface; and selecting the second candidate group such that the second candidate group includes at least one lane that is unused as a result of the at least one function being in a deactivated state.

6. The method of claim 5, wherein the at least one function comprises:
at least one of a data masking function, a data bus inversion function, and an error correction function.

7. The method of claim 1, further comprising:
performing a third training by communicating with the second device by using a third candidate group of lanes from among the plurality of lanes, the third candidate group being different from the first candidate group and different from the second candidate group,
wherein the determined lane group is determined based on a result of the first training, a result of the second training, and a result of the third training.

8. The method of claim 1, further comprising:
verifying lanes between the first device and the second device from among the plurality of lanes,
wherein the first candidate group and the second candidate group include lanes, from among the plurality of lanes, that are determined to be valid lanes as a result of the verifying.

9. The method of claim 1,
wherein the performing of the first training includes transmitting a first soft mapping command for the temporarily setting the first candidate group to the second device,
wherein the performing of the second training includes transmitting a second soft mapping command for the temporarily setting the second candidate group to the second device, and
wherein the setting of the second device includes transmitting to the second device a hard mapping command permanently setting the lane group.

10. A first device configured to communicate with a second device based on a physical interface, the first device comprising:
a routing circuit configured to select some of a plurality of lanes based on a control signal, for the physical interface; and
processing circuitry configured to,
generate the control signal for determining timings for different candidate groups of the plurality of lanes by training the physical interface by using each of different candidate groups of lanes from among the plurality of lanes to communicate a signal between the first device and the second device, and
determine a lane group to be used for the physical interface based on a result of the training, the result of the training including a comparison of the timings for the different candidate groups,
wherein the processing circuitry is further configured to identify deactivation of at least one function of the physical interface, and generate the control signal for training the physical interface based on a candidate group of lanes, from among the plurality of lanes, that includes at least one lane that is unused as a result of the at least one function being in a deactivated state.

11. The first device of claim 10, wherein the processing circuitry is further configured to perform a first training of the physical interface by using a first candidate group among the plurality of lanes, select a second candidate group among the plurality of lanes based on a result of the first training, and perform a second training of the physical interface by using the second candidate group.

12. The first device of claim 11, wherein the processing circuitry is further configured to detect a plurality of first valid window margins each corresponding to a plurality of lanes comprised in the first candidate group in the first training, identify a first lane corresponding to a minimum first valid window margin of the plurality of first valid window margins, and select the second candidate group from the plurality of lanes excluding the first lane.

13. The first device of claim 10, wherein the routing circuit comprises:
a decoder configured to generate a plurality of select signals by decoding the control signal; and
a plurality of multiplexers configured to form paths based on the plurality of select signals.

14. A system comprising:
a plurality of interconnections; and
a first device and a second device configured to communicate with each other via at least some of the plurality of interconnections based on a physical interface,
wherein the first device and the second device are further configured to train the physical interface by using each of a plurality of different candidate groups, each candidate group including interconnections from among the plurality of interconnections, to communicate a signal between the first device and the second device,
wherein the physical interface includes a high bandwidth memory (HBM) interface,
wherein the second device includes a plurality of memory dies that are stacked,
wherein the plurality of interconnections include at least one through silicon via penetrating at least one of the plurality of memory dies, and
wherein first device is configured to determine an interconnection group to be used for the physical interface based on training results, the training results including a comparison of timings for each of the plurality of different candidate groups.

15. The system of claim 14,
wherein the first device and the second device are further configured to perform a first training of the physical interface by using a first candidate group from among the plurality of different candidate groups, and perform a second training of the physical interface by using a second candidate group from among the plurality of different candidate groups, and
wherein the first device is configured to select the second candidate group among the plurality of interconnections based on a result of the first training.

16. The system of claim 14, wherein the first device and the second device are further configured to train the physical interface using a candidate group, from among the plurality of different candidate groups, that includes at least one interconnection, from among the plurality of interconnections, that is unused as a result of at least one function of the physical interface being set in a deactivated state.

17. The system of claim 14,
wherein the first device includes a base die, and
wherein the plurality of memory dies are stacked on the base die.

* * * * *